United States Patent
Oh et al.

(10) Patent No.: US 9,830,415 B2
(45) Date of Patent: Nov. 28, 2017

(54) STANDARD CELL LIBRARY, METHOD OF USING THE SAME, AND METHOD OF DESIGNING SEMICONDUCTOR INTEGRATED CIRCUIT

(71) Applicant: SAMSUNG ELECTRONICS CO., LTD., Suwon-si, Gyeonggi-Do (KR)

(72) Inventors: Sang-kyu Oh, Gwacheon-si (KR); Sang-hoon Baek, Seoul (KR); Seung-young Lee, Incheon (KR); Tae-joong Song, Seongnam-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 168 days.

(21) Appl. No.: 14/799,750

(22) Filed: Jul. 15, 2015

(65) Prior Publication Data

US 2016/0055283 A1   Feb. 25, 2016

Related U.S. Application Data

(60) Provisional application No. 62/040,706, filed on Aug. 22, 2014.

(30) Foreign Application Priority Data

Jan. 9, 2015   (KR) .................. 10-2015-0003480

(51) Int. Cl.
  *G06F 9/455*   (2006.01)
  *G06F 17/50*   (2006.01)
(52) U.S. Cl.
  CPC ...... *G06F 17/5072* (2013.01); *G06F 17/5081* (2013.01); *G06F 2217/82* (2013.01)

(58) Field of Classification Search
  USPC ........................................ 716/112
  See application file for complete search history.

(56) References Cited

U.S. PATENT DOCUMENTS 5,802,349 A * 9/1998 Rigg .................. G06F 17/5045
                                                    716/103
7,469,389 B2   12/2008 Namba et al.
(Continued)

FOREIGN PATENT DOCUMENTS

JP    2000020567    1/2000
JP    2001210721    8/2001
(Continued)

*Primary Examiner* — Bryce Aisaka
(74) *Attorney, Agent, or Firm* — F. Chau & Associates, LLC

(57) ABSTRACT

A method of designing a semiconductor integrated circuit (IC) is provided as follows. A standard cell library is generated. The standard cell library includes characteristic information for a plurality of standard cells. The characteristic information includes a characteristic of each standard cell. A characteristic change region is detected. The characteristic change region includes at least one of the plurality of standard cells by comparing characteristics of standard cells to be placed adjacent to the characteristic change region, based on the standard cell library. A characteristic of the at least one standard cell included in the detected characteristic change region is changed to one of the characteristics of the standard cells to be placed adjacent to the characteristic change region to update the standard cell library. A plurality of standard cells of the updated standard cell library is placed.

20 Claims, 19 Drawing Sheets

(56) References Cited

U.S. PATENT DOCUMENTS

| | | | |
|---|---|---|---|
| 8,239,797 B1 | 8/2012 | Ghosh et al. | |
| 8,482,070 B1 | 7/2013 | Flatresse et al. | |
| 2006/0036972 A1* | 2/2006 | Barbera | G06F 17/505 |
| | | | 716/102 |
| 2010/0270600 A1 | 10/2010 | Inukai et al. | |
| 2014/0183646 A1* | 7/2014 | Hatamian | G06F 17/5081 |
| | | | 257/369 |

FOREIGN PATENT DOCUMENTS

| | | |
|---|---|---|
| JP | 2006286862 | 10/2006 |
| JP | 2009135264 | 6/2009 |
| KR | 1020080024692 | 3/2008 |

\* cited by examiner

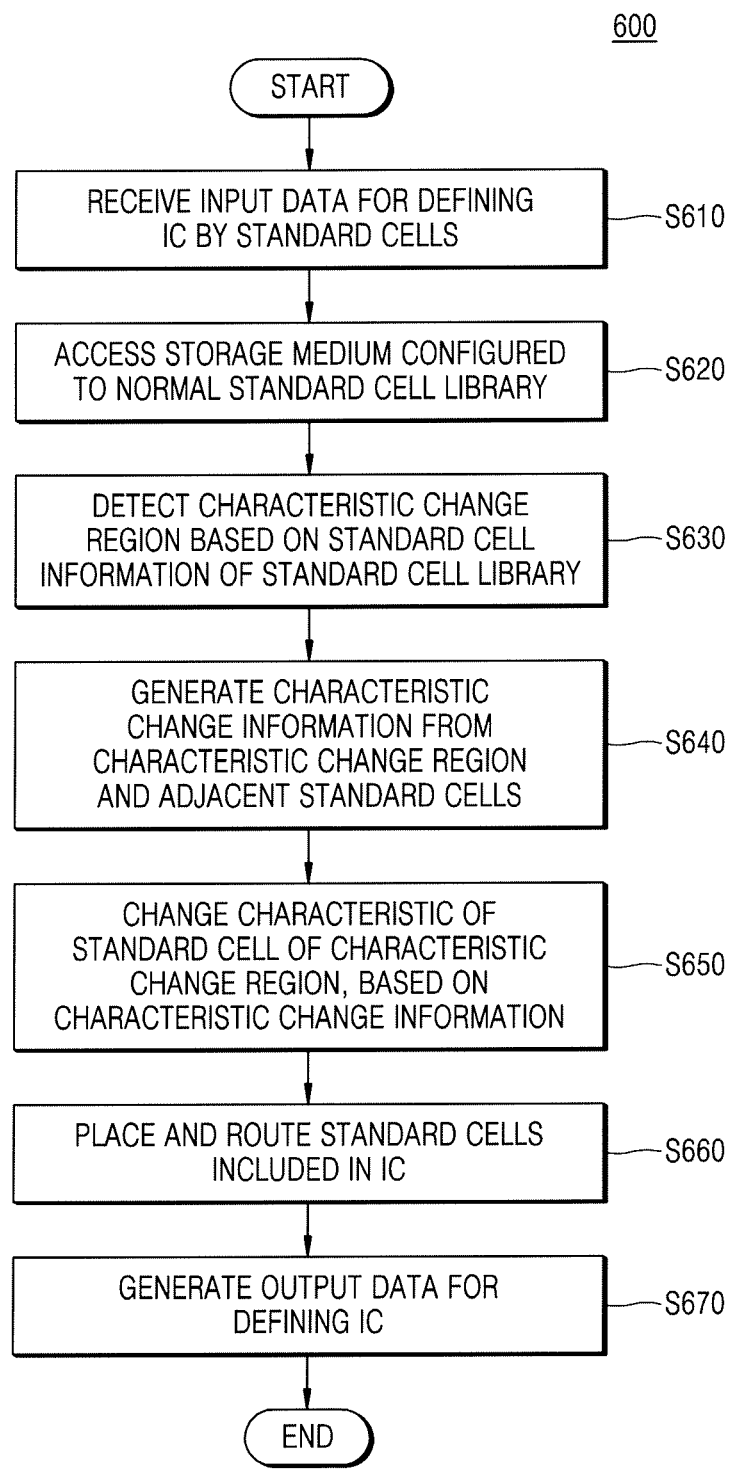

STANDARD CELL LIBRARY, METHOD OF USING THE SAME, AND METHOD OF DESIGNING SEMICONDUCTOR INTEGRATED CIRCUIT

CROSS-REFERENCE TO RELATED APPLICATION

This application claims priority under 35 U.S.C. 119 to Korean Patent Application No. 10-2015-0003480, filed on Jan. 9, 2015 in the Korean Intellectual Property Office, the disclosure of which is incorporated by reference herein in its entirety, and claims the benefit under 35 U.S.C. §119(e) of U.S. Provisional Application No. 62/040,706, filed on Aug. 22, 2014 in the United States Patent and Trademark Office, the disclosure of which is incorporated by reference herein in its entirety.

TECHNICAL

The present inventive concept relates to a standard cell library, a method of using the same, and a method of designing a semiconductor integrated circuit (IC).

DISCUSSION OF THE RELATED ART

With development semiconductor process technology, transistors have gradually been downscaled, and greater numbers of transistors have been integrated in a unit area of a semiconductor device. For example, a system-on-chip (SOC) include various functional blocks integrated in a single chip. Each functional block may operate under different, optimal operating conditions. A layout or mask information may be generated to have various functional blocks which operate under different optimal operating conditions.

SUMMARY

According to an exemplary embodiment of the present inventive concept, a method of designing a semiconductor integrated circuit (IC) is provided as follows. A standard cell library is generated. The standard cell library includes characteristic information. The characteristic information includes a characteristic of each standard cell. A characteristic change region is detected. The characteristic change region includes at least one of the plurality of standard cells by comparing characteristics of standard cells to be placed adjacent to the characteristic change region. A characteristic of the at least one standard cell included in the detected characteristic change region is changed to one of the characteristics of the standard cells to be placed adjacent to the characteristic change region to update the standard cell library. A plurality of standard cells of the updated standard cell library is placed.

According to an exemplary embodiment of the present inventive concept, a computer-readable storage medium having stored therein a standard cell library is provided as follows. The standard cell library includes characteristic information for each of standard cells, and characteristic change information to change a characteristic of a standard cell.

According to an exemplary embodiment of the present inventive concept, a method of generating a layout of an integrated circuit (IC) is provided as follows. A standard cell library including a layout information of at least a first layer and a block layer is generated. A design rule violation is detected in the layout information. The design rule violation occurs if the block layer overlaps at least two standard cells of the first layer and wherein the at least two standard cells have different characteristics from each other. A characteristic change region is determined from the at least two standard cells. A characteristic change information is generated. The standard cell library is updated with the characteristic change information. The layout is generated using the updated standard cell library.

BRIEF DESCRIPTION OF THE DRAWINGS

These and other features of the inventive concept will become more apparent by describing in detail exemplary embodiments thereof with reference to the accompanying drawings of which:

FIG. 8 is a flowchart of a method of designing a semiconductor IC according to an exemplary embodiment of the present inventive concept;

DETAILED DESCRIPTION OF EXEMPLARY EMBODIMENTS

Figure 1:
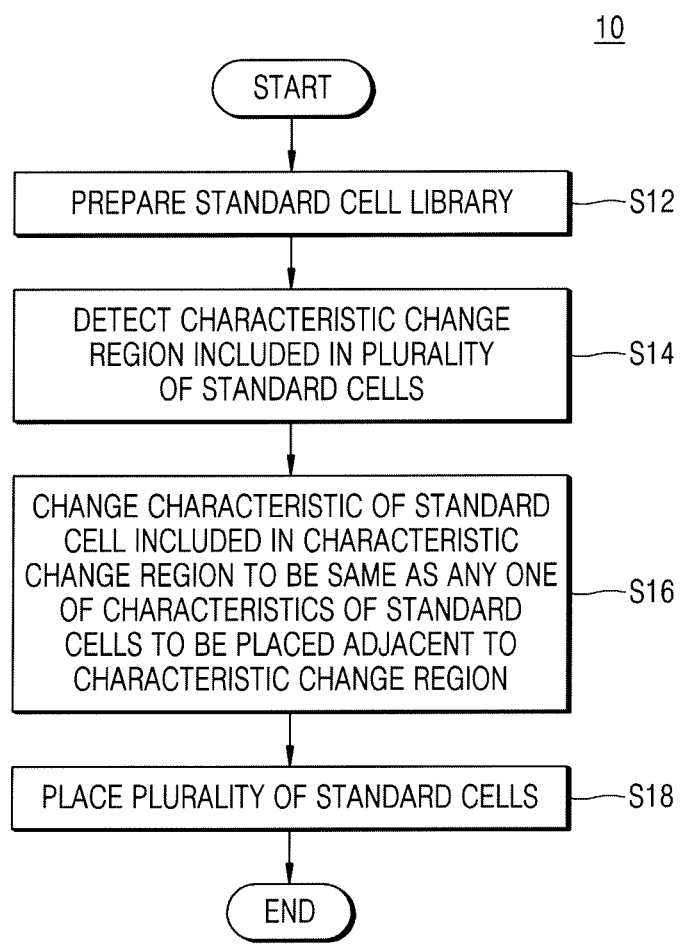
FIG. 1 is a flowchart of a method of placing a plurality of standard cells according to an exemplary embodiment of the present inventive concept.

Exemplary embodiments of the inventive concept will be described below in detail with reference to the accompanying drawings. However, the inventive concept may be embodied in different forms and should not be construed as limited to the embodiments set forth herein. In the drawings, the thickness of layers and regions may be exaggerated for clarity. It will also be understood that when an element is referred to as being "on" another element or substrate, it may be directly on the other element or substrate, or intervening layers may also be present. It will also be understood that when an element is referred to as being "coupled to" or "connected to" another element, it may be directly coupled to or connected to the other element, or intervening elements may also be present. Like reference numerals may refer to the like elements throughout the specification and drawings.

FIG. 1 is a flowchart 10 of a method of designing a semiconductor integrated circuit (IC) according to an exemplary embodiment of the inventive concept.

Referring to FIG. 1, initially, the standard cell library may be prepared (S12). The standard cell library may be prepared to design a semiconductor IC including a plurality of standard cells. The standard cell may be physically changed to a layout or mask information to be used for fabricating the semiconductor IC. The standard cells are to be placed and routed to generate the layout. The standard cell library may include characteristic information of the standard cells. Also, the characteristic information may be stored in a computer-readable storage medium. The semiconductor IC may include physical structures corresponding to the standard cells, and a software tool for designing the semiconductor IC may generate a layout of the semiconductor IC using the standard cell library including the characteristic information of the standard cells.

A characteristic change region may be detected from the standard cells of the standard cell library (S14). The standard cell library may include information of positions of the respective standard cells within the semiconductor IC. A characteristic change region may be a standard cell region of which characteristics differs from other standard cell regions adjacent to the characteristic change region. The standard cell region has standard cells having the same characteristics from each other. In an exemplary embodiment, the characteristic change region may refer to a standard cell region in which at least one standard cell has a characteristic to be changed to avoid design rule violations. The changed characteristic may be the characteristic of one of the standard cells adjacent to the characteristic change region. The standard cells to be placed adjacent to the characteristic change region may be placed adjacent to both sides of the characteristic change region in a horizontal direction or adjacent to the characteristic change region in a vertical direction. The characteristic change region may be detected based on characteristic information of the standard cells adjacent to the characteristic change region. The characteristic information of each standard cell may be one of the number of active fins, a gate length and a depth of a doped well of each standard cell.

In an embodiment, an operation of detecting the characteristic change region may include selecting a target standard cell region including at least standard cell having a different characteristic from the characteristics of the standard cells adjacent to the target standard cell region, and determining whether the target standard cell region corresponds to the characteristic change region. Alternatively, the characteristic change region may be detected without selecting a target standard cell region. This alternative embodiment will be described later.

Thereafter, the characteristic of the standard cells included in the characteristic change region may be changed to the characteristics of the standard cells included one of the standard cell regions adjacent to the characteristic change region (S16). In this case, a characteristic of at least one standard cell included in the characteristic change region may be changed. For example, the characteristics of all standard cells included in the characteristic change region may be changed. In an exemplary embodiment, the characteristics of the standard cells in the characteristic change region may be changed according to priority information. The priority information may include a characteristic to be changed in the standard cells of the characteristic change region. The priority information will be described later. Accordingly, the standard cell library generated in step S12 is updated with the characteristic change region. The plurality of standard cells including the standard cells of which characteristic is changed and which are included in the characteristic change region may be placed on the wafer based on the standard cell library (S18).

By changing the characteristic of the standard cells included in the characteristic change region, a block layer for forming a gate or a well in each of the standard cells may be formed on the standard cell region including the standard cells having the same characteristic. Accordingly, design rule violation may be prevented so that degradation of a semiconductor device may be inhibited and performance of the semiconductor device may be increased. These effects will be described in detail later.

Figure 2:
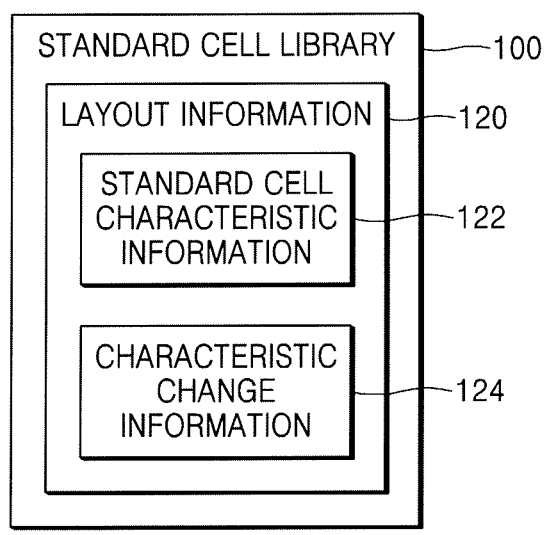
FIG. 2 is a diagram of a standard cell library according to an exemplary embodiment of the present inventive concept.

FIG. 2 is a diagram of a standard cell library 100 according to an exemplary embodiment of the inventive concept.

Referring to FIG. 2, the standard cell library 100 may include information related with standard cells, for example, information regarding layout functions of standard cells, timing information, power information, or layout information. For example, the standard cell library 100 may include layout information 120. The layout information 120 may include data corresponding to a layout characteristic of a plurality of standard cells included in the standard cell library 100.

The layout information 120 may include standard cell characteristic information 122, which is information regarding a characteristic of a plurality of standard cells, and characteristic change information 124, which is required to change a characteristic of a standard cell of the characteristic change region of FIG. 1. As described with reference to FIG. 1, the tool for designing a semiconductor IC may use the standard cell library 100, and the characteristic change region may be detected based on the standard cell characteristic information 122 included in the standard cell library 100. Also, the characteristic of the standard cell included in the characteristic change region may be changed based on the characteristic change information 124 including information indicating a cell region corresponding to the detected characteristic change region and information regarding the characteristic to be changed.

Figure 3:
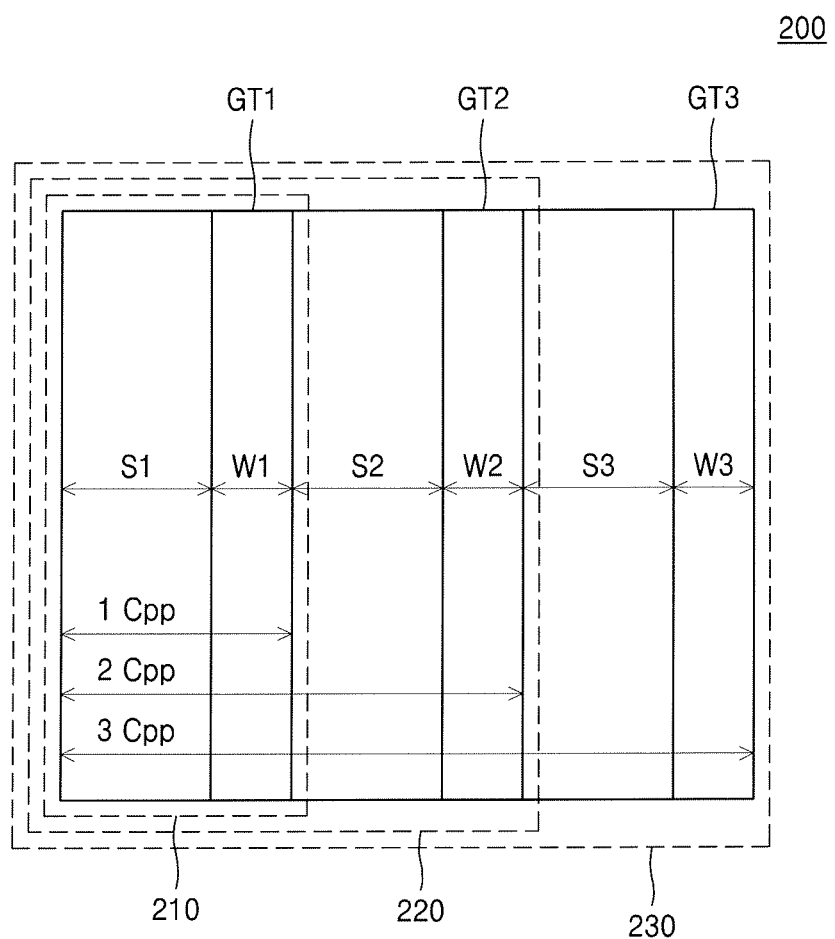
FIG. 3 is a diagram showing a size of a cell region according to an exemplary embodiment of the present inventive concept.

FIG. 3 is a diagram of a size of a standard cell region 200 according to an exemplary embodiment of the inventive concept.

Referring to FIG. 3, the standard cell region 200 may be one of a 1 critical-poly-pitch (CPP) cell region 210, a 2 CPP cell region 220, or a 3CPP cell region 230 according to size. A CPP unit may correspond to a pitch equal to the sum of a space between two adjacent gates formed in a standard cell and one gate length. For example, the CPP unit may be a pitch equal to the sum of a second space S2 between a first gate GT1 and a second gate GT2 and a length of the second gate GT2. Accordingly, the 1 CPP cell region 210 may have a size equal to the sum of a first space S1 and a length of a first gate GT1, and the 2 CPP cell region 220 may have a size equal to the sum of the first space S1, the length of the first gate GT1, the second space S2, and the length of the second gate GT2. Also, the 3 CPP cell region 230 may have a size equal to the sum of the first space S1, the length of the first gate GT1, the second space S2, the length of the second gate GT2, a third space S3, and a length of a 3 gate GT3.

The standard cell region 200 may include at least one standard cell. The 1 CPP cell region 210 may include a standard cell having a size of 1 CPP. The 2 CPP cell region 220 may include two standard cells, each of which has a size of 1 CPP, or include one standard cell having a size of 2 CPP. Also, the 3 CPP cell region 230 may include three standard cells, each of which has a size of 1 CPP, include both one standard cell having a size of 2 CPP and one standard cell having a size of 1 CPP, or include one standard cell having a size of 3 CPP.

Figure 4A:
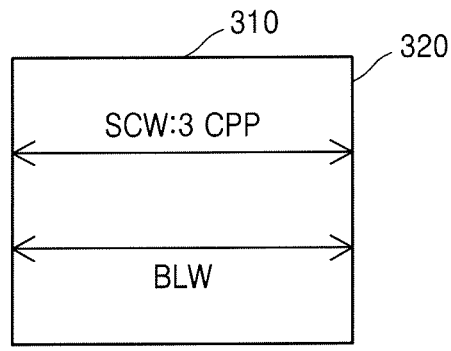
FIG. 4A to 4C are diagrams showing a relationship between a size of a cell region and a size of a block layer.
Figure 4B:
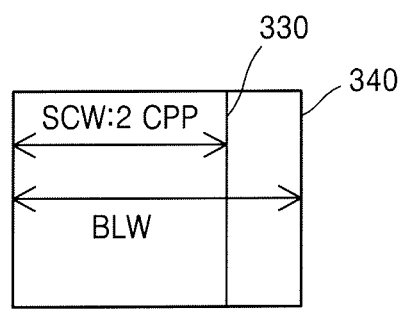
Figure 4C:
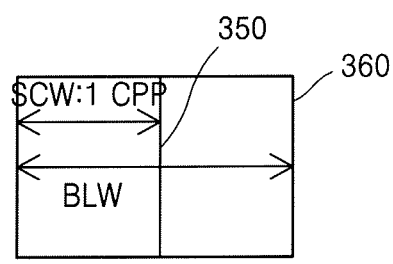

FIGS. 4A to 4C are diagrams showing a size relationship between a cell region and a block layer. The size of the cell region may be referred to as SCW, and the size of the block layer may be referred to as BLW.

The block layer may correspond to a layer formed on a plurality of standard cells to form a gate or a well on each of the plurality of standard cells that are placed. A different kind of block layer may be formed according to a characteristic of the plurality of standard cells. By changing a characteristic of standard cells included in a characteristic change region, the block layer for forming the gate or the well in each of the standard cells may be formed on a cell region including standard cells having the same characteristic in a subsequent semiconductor process. However, there may be a technical limit to reducing the size BLW of the block layer to a size of a standard cell region in terms of a semiconductor process.

Referring to FIG. 4A, a standard cell region 310 having a size of 3 CPP and a block layer 320 having a size of 3 CPP are shown. In this case, the standard cell region 310 has the size of 3 CPP, including at least one standard cell having the same characteristic. The block layer 320 having the size of 3 CPP may be formed on the standard cell region 310 having the size of 3 CPP. Accordingly, design rule violation does not occur.

In FIG. 4B, a standard cell region 330 has a size of 2 CPP and a block layer 340 has a size of 3 CPP. In FIG. 4C, a standard cell region 350 has a size of 1 CPP and a block layer 360 has a size of 3 CPP. In this case where the minimum size BLW of the block layer may correspond to 3 CPP in terms of a semiconductor process, the block layer 340 and 360 having a size of 3 CPP may be formed on a standard cell region that is adjacent to the standard cell region 330 having the size of 2 CPP and the standard cell region 350 having the size of 1 CPP. Accordingly, design rule violation may occur. According to an exemplary embodiment of the inventive concept, the design rule violation may be avoided. The present inventive concept is not limited to the minimum size BLW of the block layer having 3 CPP, and the minimum size BLW may have various sizes according to a semiconductor process.

Figure 5:
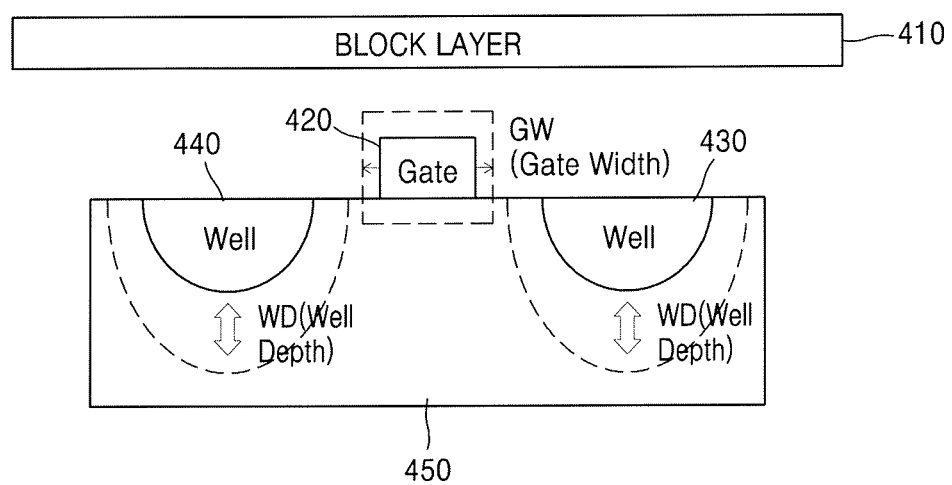
FIG. 5 is a diagram showing changes in a gate length or a depth of a formed well of a standard cell according to an exemplary embodiment of the present inventive concept.

FIG. 5 is a diagram showing changes in a gate length or a depth of a formed well of a standard cell 400.

Referring to FIG. 5, the standard cell 400 may include a gate 420 and a well 430 formed in a wafer 450. A block layer 410 may be an implant layer for forming the well 430. In this case, standard cells may be divided into different kinds according to a well depth WD. For example, a high voltage transistor (HVT) standard cell may have the largest well depth WD, a regular voltage transistor (RVT) standard cell may have a middle well depth WD, and a low voltage transistor (LVT) standard cell may have the smallest well depth. In an embodiment, standard cells may be divided into more different kinds according to a well depth that a standard cell has.

The HVT standard cell may operate faster than the RVT standard cell and the LVT standard cell. The RVT standard cell may operate faster than the LVT standard cell. In this case, the HVT standard cell may consume more power than the LVT standard cell and the RVT standard cell. Higher voltage input may be applied to the HVT standard cell than the RVT and/or LVT standard cells.

When the block layer corresponds to the wimpy layer, the gate length GW may change to larger gate length than in normal standard cells using the block layer. As the gate length GW increases, the speed of the transistor may be reduced, and power consumption may be reduced. As described above, the block layer has a minimum size greater than a minimum size of a standard cell region. To prevent design rule violations, the block layer should be formed on a standard cell region having a size equal to or greater than the minimum size of the block layer. In this case, standard cells included in the standard cell region having the size equal to or greater than the minimum size of the block layer may have the same characteristic. For example, the standard cells included in a standard cell region disposed under a block layer may have the same well depth WD (i.e., the same characteristic), and correspond to HVT standard cells.

Figure 6:
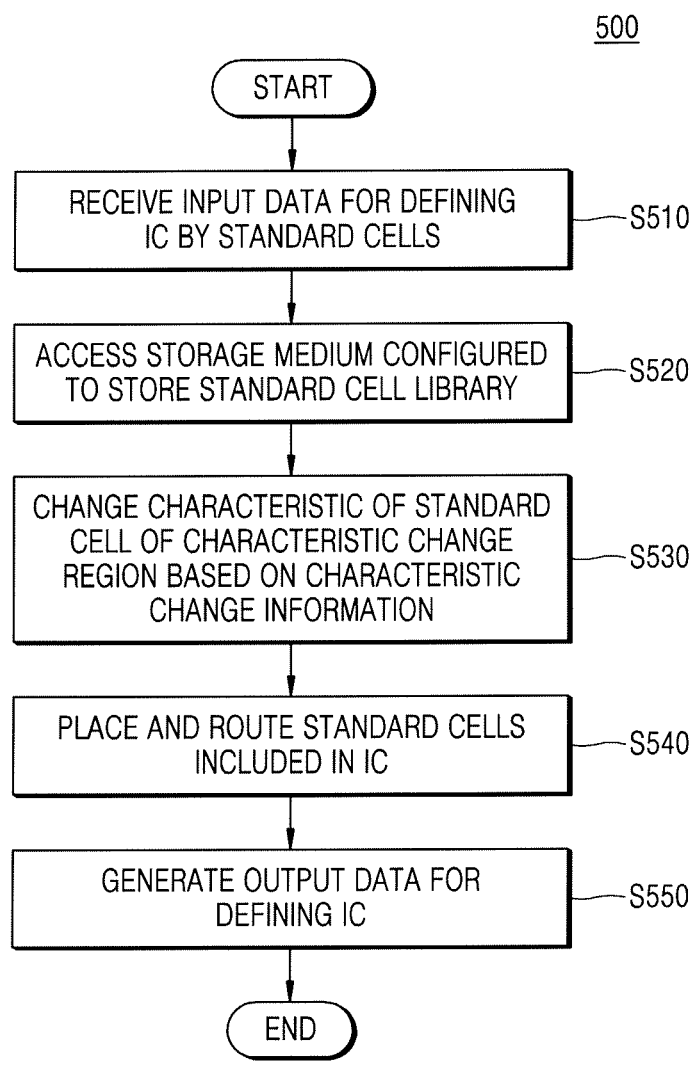
FIG. 6 is a flowchart of a method of using a standard cell library according to an exemplary embodiment of the present inventive concept.

FIG. 6 is a flowchart of a method 500 of using a standard cell library according to an exemplary embodiment of the inventive concept.

The method 500 of using the standard cell library may be performed in a tool for designing a semiconductor IC. The tool for designing the semiconductor IC may be a program including a plurality of commands that are executed by a processor. As shown in FIG. 6, the method 500 of using the standard cell library may include receiving input data for defining an IC by standard cells (S510). The input data may be data generated by synthesizing an abstract type of behavior of the IC, for example, data defined by a register transfer level (RTL), using the standard cell library. For example, the input data may be a bitstream or a netlist generated by synthesizing an IC defined by a hardware description language (HDL), such as a VHSIC HDL (VHDL) and Verilog.

According to an exemplary embodiment of the inventive concept, the method of using the standard cell library 500 may include accessing a storage medium configured to store the standard cell library (S520). As described with reference to FIG. 2, the standard cell library according to an exemplary embodiment of the inventive concept may include standard cell characteristic information, which may be information regarding a characteristic of a plurality of standard cells, and characteristic change information for changing a characteristic of a standard cell of the characteristic change region shown in FIG. 1.

According to an exemplary embodiment of the inventive concept, the standard cell library may be stored in the storage medium, and the tool for designing the IC may access the storage medium and use the standard cell library.

A characteristic of a standard cell of the characteristic change region may be changed based on characteristic change information (S530). The characteristic change information may include information indicating cell regions corresponding to the detected characteristic change region and information regarding the characteristic to be changed. The information regarding to the characteristic to be changed may be set according to priority of the semiconductor IC to be designed, which will be described in detail later.

Standard cells included in the semiconductor IC may be placed and routed based on the standard cell library (S540) to generate a layout for the semiconductor IC. Input data may include the standard cells included in the semiconductor IC and information regarding a connection relationship between the standard cells. The method 500 of using the standard cell library may include placing and routing the standard cells included in the semiconductor IC based on the input data and completing a layout of the IC.

According to an exemplary embodiment of the inventive concept, in the operation S540 of placing and routing the standard cells included in the semiconductor IC, a plurality of standard cells including standard cells, of which the characteristic is changed and which are included in the characteristic change region, may be placed and routed to generate a layout. By placing the standard cells after changing the characteristic of the standard cells included in the characteristic change region, design rule violation in the layout may be avoided, performance of the semiconductor IC may be increased, and yield of a semiconductor device including the semiconductor IC may be increased.

Furthermore, the operation S540 of placing and routing the standard cells may obey predetermined design rules other than the design rule mentioned in FIG. 4. Thereafter, output data for designing the semiconductor IC may be generated (S550). The characteristic of the standard cell of the characteristic change region may be changed to one of characteristics of standard cells to be placed adjacent to the characteristic change region, based on the standard cell characteristic information and the characteristic change information included in the standard cell library. Output data for defining the semiconductor IC including the standard cells that are placed and routed in the operation S540 may be generated. According to an exemplary embodiment of the inventive concept, the output data may include all pieces of layout information of the standard cells. For example, the output data may have a graphic database system (GDS) format in which all layers include pattern information, or an executable and linkable format (ELF) format or a milkyway format. The ELF format and milkyway format may include external information regarding standard cells, such as fins of the standard cells.

Figure 7:
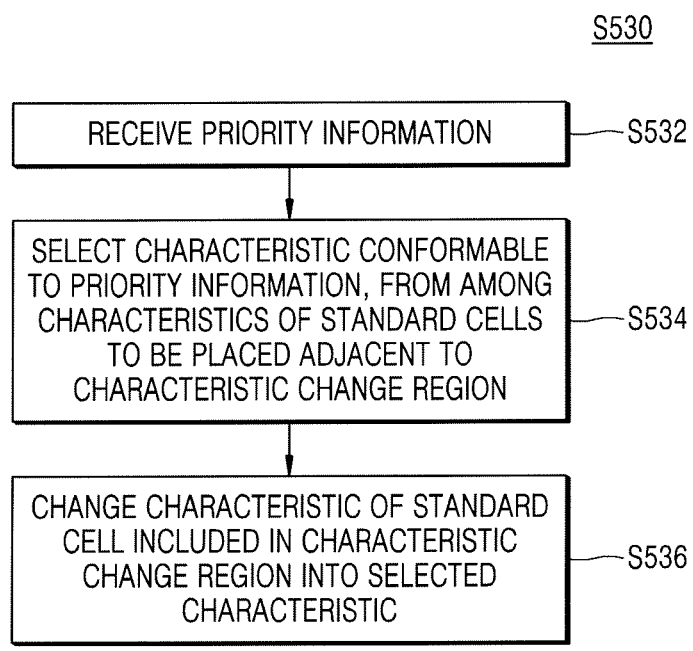
FIG. 7 is a flowchart of a method of changing a characteristic of a standard cell of a characteristic change region in a method of using a standard cell library according to an exemplary embodiment of the present inventive concept.

FIG. 7 is a flowchart of a method of changing a characteristic of a standard cell of a characteristic change region in a method of using a standard cell library according to an exemplary embodiment of the inventive concept.

A characteristic of a standard cell to be placed adjacent to one side of the characteristic change region may be different from a characteristic of a standard cell to be placed adjacent to another side thereof. Thus, to change the characteristic of the standard cell of the characteristic change region, one of the characteristics of the standard cells to be placed adjacent to the characteristic change region may be selected. The characteristic of a standard cell in the characteristic change region may be changed to the selected characteristic. Thus, priority information of a semiconductor IC may be received (S532). The priority information may include at least one of operating speed and power consumption of the semiconductor IC to which the characteristic of the characteristic change region is changed. The priority information may be included in the input data shown in FIG. 6. Alternatively, the priority information may be included in the standard cell library.

Thereafter, a characteristic corresponding to the priority information may be selected out of characteristics of the standard cells to be placed adjacent to the characteristic change region (S534). In an exemplary embodiment, when designing of the semiconductor IC gives priority to operating speed over power consumption with reference to the priority information, a characteristic in which a transistor included in the standard cell has a higher operating speed may be selected out of the characteristics of the standard cells to be placed adjacent to the characteristic change region. However, in an exemplary embodiment, when power consumption has priority over operating speed, a characteristic in which the transistor included in the standard cell has lower power consumption may be selected. The characteristic of the standard cell included in the characteristic change region may be changed to the selected characteristic (S536).

FIG. 8 is a flowchart 600 of a method of designing a semiconductor IC according to an exemplary embodiment of the inventive concept.

The method of designing the semiconductor IC may be performed in a tool for designing the semiconductor IC. The tool for designing the semiconductor IC may be a program including a plurality of commands that are executed by a processor. Unlike the method 500 of using the standard cell library shown in FIG. 6, the method of designing the semiconductor IC shown in FIG. 8 may use a normal standard cell library, that is, a standard cell library that is free from characteristic change information, and generate the characteristic change information by detecting a characteristic change region.

As shown in FIG. 8, input data for defining the semiconductor IC by standard cells may be received (S610). For example, the input data may be a bitstream or a netlist generated by synthesizing an IC defined as a hardware description language (HDL), such as a very high speed integrated circuit (VHSIC) HDL (VHDL) and Verilog. The method of FIG. 8 may include accessing a storage medium configured to store the normal standard cell library (S620). The normal standard cell library may include layout information and timing information regarding the standard cell.

According to an exemplary embodiment of the inventive concept, a characteristic change region may be detected based on characteristic information regarding the standard cells of the standard cell library (S630). A size of a target standard cell region, which is a target for detection of whether the target standard cell region is a characteristic change region, or a size of adjacent cell regions including at least one standard cell, which are to be placed adjacent to two sides of the target standard cell region, may be compared with a minimum size of a block layer formed on the target standard cell region or the adjacent cell regions. Each of the target standard cell region and the adjacent cell regions may include at least one standard cell having the same characteristic. In an exemplary embodiment, the characteristic may be a depth of a well of the at least one standard cell. For example, all standard cells of the target standard cell region may have a regular voltage threshold (RVT) characteristic described with reference to FIG. 5. All standard cells of an adjacent cell region that is adjacent to one side of the target standard cell region may have a standard voltage threshold (SVT) characteristic, while all standard cells of an adjacent cell region that is adjacent to another side thereof may have a low voltage threshold (LVT) characteristic. As described above with reference to FIG. 4, a block layer has a minimum size. If one of the target standard cell region and the adjacent cell regions has a smaller size than the minimum size of the block layer, the target standard cell region may be detected as a characteristic change region.

The characteristic change information may be generated from the characteristic change region and the adjacent standard cells (S640). The characteristic change information may be information for changing a characteristic of a standard cell included in the characteristic change region. The characteristic change information may include a position of the standard cell of the characteristic change region and a new characteristic to which the characteristic of the standard cell of the characteristic change region is to be subsequently changed. The characteristic of the standard cell of the characteristic change region may be changed based on the characteristic change information (S650). The characteristic change region may include at least one standard cell. When the characteristic change region includes a plurality of standard cells, the characteristic of at least one of the plurality of standard cells may be changed. The characteristic of the standard cell of the characteristic change region may be changed to one of the characteristics of the standard cells to be placed adjacent to the characteristic change region, so that the characteristic change region and the adjacent cell region disposed under the block layer may have the same characteristics. For example, a size of a combined standard cell of the characteristic change region and the adjacent cell region may be equal to or greater than the minimum size of the block layer.

According to an exemplary embodiment of the inventive concept, the plurality of standard cells including the standard cell, of which characteristic is changed and which is included in the characteristic change region, may be placed and routed (S660). The input data received in step S610 is updated with the characteristic change information. The input data may include a standard cell library of the semiconductor IC. The standard cell, of which the characteristic is changed, may be placed to satisfy the minimum size of the block layer, so design rule violations may be avoided.

According to an exemplary embodiment of the inventive concept, output data for defining the semiconductor IC may be generated (S670). For example, the output data may have a GDS format including all pieces of layout information of standard cells or an ELF format or a Milkyway format including external information of the standard cell.

Figure 9A:
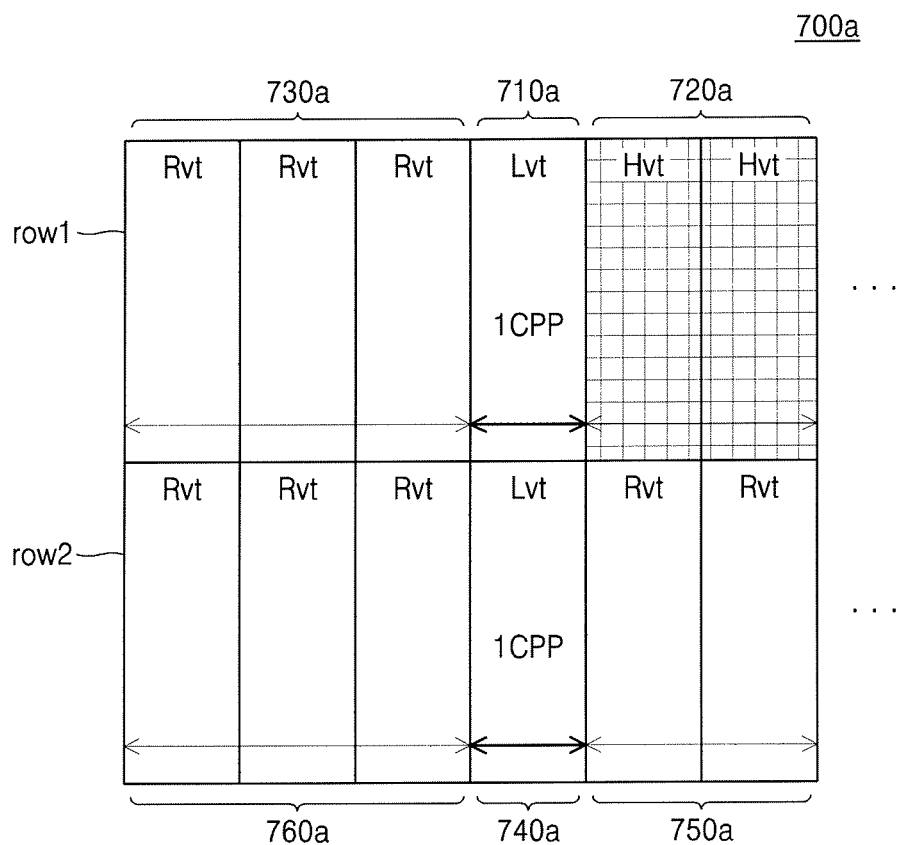
FIGS. 9A and 9B are diagrams illustrating a method of detecting a characteristic change region and a method of changing a characteristic according to an exemplary embodiment of the present inventive concept.
Figure 9B:
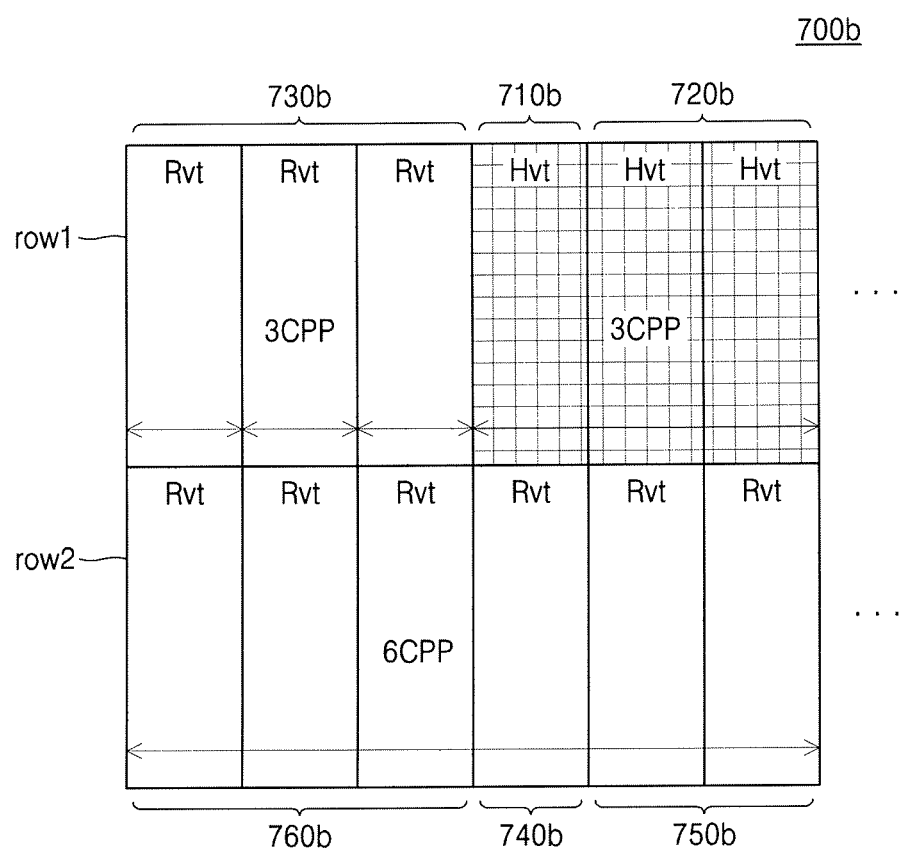

FIGS. 9A and 9B are diagrams 700*a*, 700*b* illustrating a method of detecting a characteristic change region and a method of changing the characteristic thereof.

FIG. 9*a* is an estimated placing diagram 700*a* obtained based on information regarding the plurality of standard cells of a standard cell library before the plurality of standard cells are placed. A first row Row1 may include an RVT standard cell region 730*a* including standard cells having an RVT characteristic, an LVT standard cell region 710*a* including standard cells having an LVT characteristic, and an HVT standard cell region 720*a* having standard cells having an HVT characteristic. In an exemplary embodiment, a standard cell region including at least one standard cell having a different characteristic from characteristics of standard cells to be placed adjacent to a target standard cell region may be selected as a target standard cell region. The target standard cell region may be a region including at least one standard cell having the same characteristic. Accordingly, since the LVT standard cell region 710*a* has a different characteristic from the characteristics of the standard cells included in the HVT standard cell region 720*a* and the RVT standard cell region 730*a*, which are standard cell regions adjacent to the LVT standard cell region 710*a*, the LVT standard cell region 710*a* may correspond to the target standard cell region. Thus, the LVT standard cell region 710*a* may be the target standard cell region, which may be a target of detection of whether the LVT standard cell region 710*a* corresponds to a characteristic change region.

For the convenience of description, it is assumed that a block layer of an implant layer has a minimum size of 3 CPP. The LVT standard cell region 710*a* may have a size of 1 CPP less than the minimum size of the LVT block layer. In this case, if the LVT standard cell region 710*a* is placed as is, the LVT block layer may be formed on both the HVT standard cell region 720*a* and RVT standard cell region 730*a* placed adjacent thereto, so design rule violation may occur. Accordingly, the LVT standard cell region 710*a* may be detected as the characteristic change region, and the characteristic of the standard cell of the LVT standard cell region 710*a* may be changed to avoid the design rule violation.

In this case, characteristic change information indicating that the LVT standard cell region 710*a* corresponds to the characteristic change region may be generated. The characteristic change information may include information indicating that the characteristic of the standard cell of the LVT standard cell region 710*a* is changed to one selected out of an HVT characteristic of the HVT standard cell region 720*a*, and an RVT characteristic of the RVT standard cell region 730*a*. The characteristic of the LVT standard cell region 710*a*, which corresponds to the characteristic change region, may be changed based on the characteristic change information. One characteristic of the HVT characteristic of the HVT standard cell region 720*a* and the RVT characteristic of the RVT standard cell region 730*a* may be selected based on priority information. The priority information may indicate priority in designing a semiconductor IC. In an exemplary embodiment, when designing of the semiconductor IC gives priority to operating speed, as shown in FIG. 5, the characteristic of the standard cell of the characteristic change region may be changed to the HVT characteristic, which may increase an operating speed of a transistor included in the standard cell. Alternatively, when designing of the semiconductor IC gives priority to power consumption, the characteristic of the standard cell of the characteristic change region may be changed into the RVT characteristic, which may reduce power consumption of the transistor included in the standard cell.

A second row Row2 may include RVT standard cell regions 750*a* and 760*a* including standard cells having an RVT characteristic and an LVT standard cell region 740*a* including standard cells having an LVT characteristic. Since the LVT standard cell region 740*a* has a different characteristic from characteristics of standard cells included in the RVT standard cell regions 750*a* and 760*a*, which are adjacent standard cell regions to be placed adjacent to a characteristic change region, the LVT standard cell region 740*a* may correspond to a target standard cell region. Thus, the LVT standard cell region 740*a* may be a target standard cell region, which may be a target of detection of whether the LVT standard cell region 740*a* corresponds to the characteristic change region. Assuming that an LVT block layer formed on the LVT standard cell region 740*a* to have an LVT characteristic may have a minimum size of 3 CPP, the LVT standard cell region 740a may have a size of 1 CPP, which is less than the minimum size of the LVT block layer. In this case, design rule violation may occur.

FIG. 9B is a diagram 700b showing that standard cells of the LVT standard cell regions 710a and 740a of FIG. 9A are placed after the characteristics thereof are changed to avoid design rule violation. If priority in designing in a semiconductor IC is put on operating speed, the characteristic of the standard cell of the LVT standard cell region 710a in the first row Row1 is changed to HVT, and then the LVT standard cell region 710a may be placed as an HVT standard cell region 710b including a standard cell having an HVT characteristic. Thus, since a combined cell region including the HVT standard cell region 710b changed from the characteristic change region 710a and the HVT standard cell region 720b placed adjacent to the HVT standard cell region 710b has a size of 3 CPP, the size of the combined standard cell region may be equal to 3 CPP, which is the minimum size of the HVT block layer formed on the HVT standard cell region 710b and 720b, so design rule violation may be prevented. However, the inventive concept is not limited thereto. For example, the semiconductor IC may give priority to power consumption so that the characteristic of the standard cell of the LVT standard cell region 710a in the first row Row1 may be changed to an RVT characteristic.

Referring back to FIG. 9A, in the second row Row2, RVT standard cell regions 750a and 760a may be placed as adjacent cell regions including RVT standard cells, which are adjacent to two sides of the LVT standard cell region 740a, which corresponds to a characteristic change region. Thus, as in FIG. 9B, the characteristic of a standard cell of the LVT standard cell region 740a in the second row row2 may be changed to an RVT characteristic so that the LVT standard cell region 740a may be placed as an RVT standard cell region 740b. Accordingly, the RVT standard cell regions 740b, 750b, and 760b, which correspond to a standard cell region including the RVT standard cell region 740b including the standard cell of which the characteristic is changed, and the RVT standard cell region 750b corresponding to the adjacent standard cell region placed adjacent to the RVT standard cell region 740b, may be placed to have a size of 6 CPP, which is greater than 3 CPP that is the minimum size of the RVT block layer formed on the RVT standard cell regions 740b, 750b, and 760b.

FIGS. 10A to 10C 800a, 800b, and 800c are diagrams illustrating a method of detecting a characteristic change region and a method of changing a characteristic according to an exemplary embodiment of the present invention.

Figure 10A:
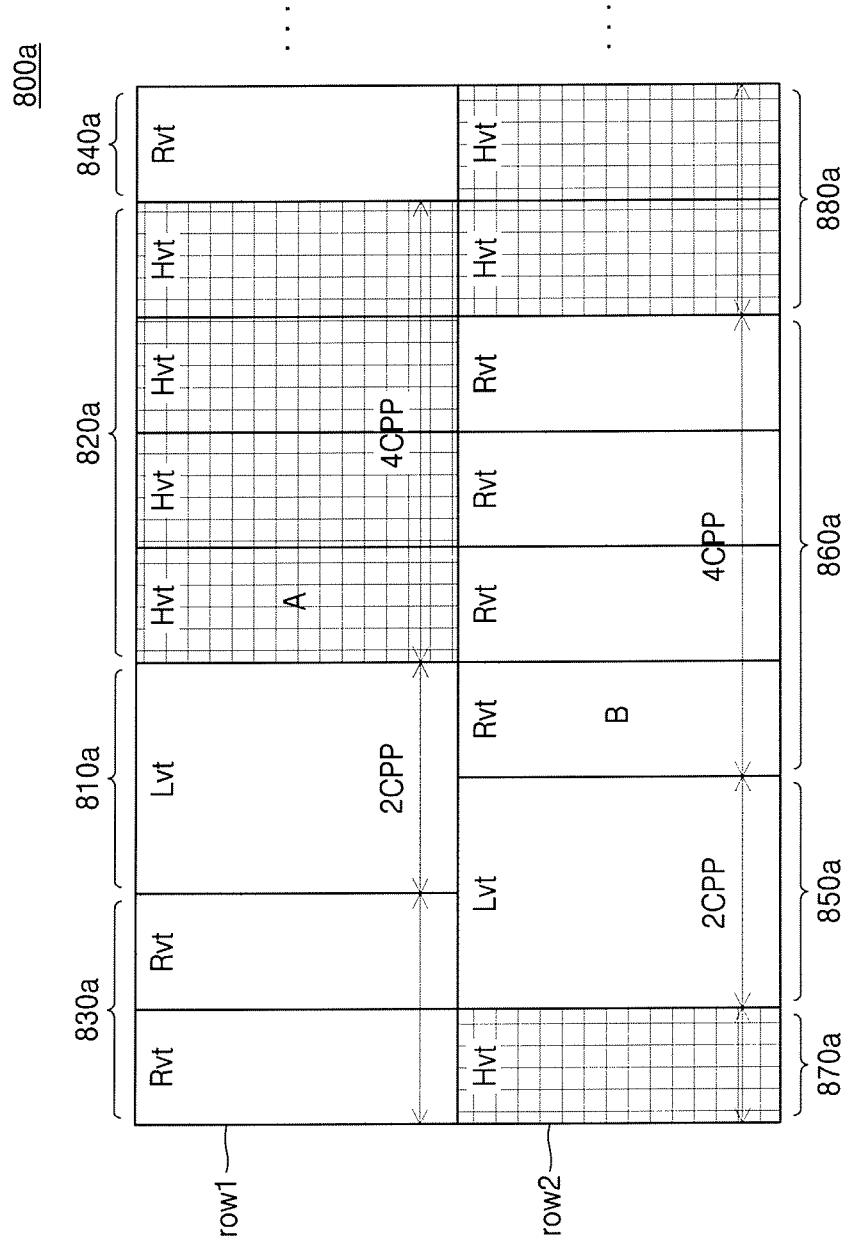
FIGS. 10A to 10C are diagrams illustrating a method of detecting a characteristic change region and a method of changing a characteristic according to an exemplary embodiment of the present inventive concept.

FIG. 10A shows an estimated placing diagram 800a obtained based on information regarding the plurality of standard cells of a standard cell library before the plurality of standard cells are placed. A first row Row1 may include an LVT standard cell region 810a including standard cells having an LVT characteristic, an HVT standard cell region 820a including standard cells having an HVT characteristic, and RVT standard cell regions 830a and 840a including standard cells having an RVT characteristic. Since the HVT standard cell region 820a has a different characteristic from characteristics of the standard cells included in the LVT standard cell region 810a and the RVT standard cell region 840a, which are adjacent to the HVT standard cell region 820a, the HVT standard cell region 820a may correspond to a target standard cell region.

Thus, it is determined that the target standard cell region of the HVT standard cell region 820a corresponds to a characteristic change region. Assuming that all block layers have the minimum size of 3 CPP and the HVT standard cell region 820a may have a size of 4 CPP, no design rule violation occurs in the HVT standard cell region 820a. The HVT standard cell region 820a has the size of 4CPP greater than the minimum block layer size of 3 CPP.

However, the LVT standard cell region 810a placed adjacent to the HVT standard cell region 820a, which is a target standard cell region, may have a size of 2 CPP, and an LVT block layer formed on the LVT standard cell region 810a may have a minimum size of 3 CPP. Thus, design rule violation due to the LVT standard cell region 810a may occur. Accordingly, the HVT standard cell region 820a may be detected as the characteristic change region, so a characteristic of at least one of the standard cells of the HVT standard cell region 820a adjacent to the characteristic change region 810a may be changed to avoid the design rule violation. In this case, characteristic change information regarding the characteristic change region may be generated. Since the generation of the characteristic change information is described above with reference to FIG. 9A, descriptions thereof are omitted here.

A second row Row2 may include an LVT standard cell region 850a including standard cells having an LVT characteristic, an RVT standard cell region 860a including standard cells having an RVT characteristic, and HVT standard cell regions 870a and 880a including standard cells having an HVT characteristic. Since the RVT standard cell region 860a has a different characteristic from characteristics of the standard cells included in the LVT standard cell region 850a and the HVT standard cell region 880a, which are adjacent to the RVT standard cell region 860a, the RVT standard cell region 860a may correspond to a target standard cell region. Thus, the RVT standard cell region 860a may be a target standard cell region, which is a target for detection of whether the RVT standard cell region 860a is a characteristic change region. Assuming that all block layers have the minimum size of 3 CPP, an RVT block layer formed on the RVT standard cell region 860a may have the minimum size of 3 CPP so that standard cells may have an RVT characteristic, and the RVT standard cell region 860a may have a size of 4 CPP. As a result, since the RVT standard cell region 860a has a greater size than the minimum size of the RVT block layer, design rule violation due to the RVT block layer does not occur on the RVT standard cell region 860a.

However, the LVT standard cell region 850a placed adjacent to the RVT standard cell region 860a that is the target standard cell region may have a size of 2 CPP, and an LVT block layer formed on the LVT standard cell region 850a may have a minimum size of 3 CPP. Thus, design rule violation may occur due to the LVT standard cell region 850a. Accordingly, the RVT standard cell region 860a may be detected as a characteristic change region, and a characteristic of at least one of the standard cells of the RVT standard cell region 860a may be changed to avoid the design rule violation.

Figure 10B:
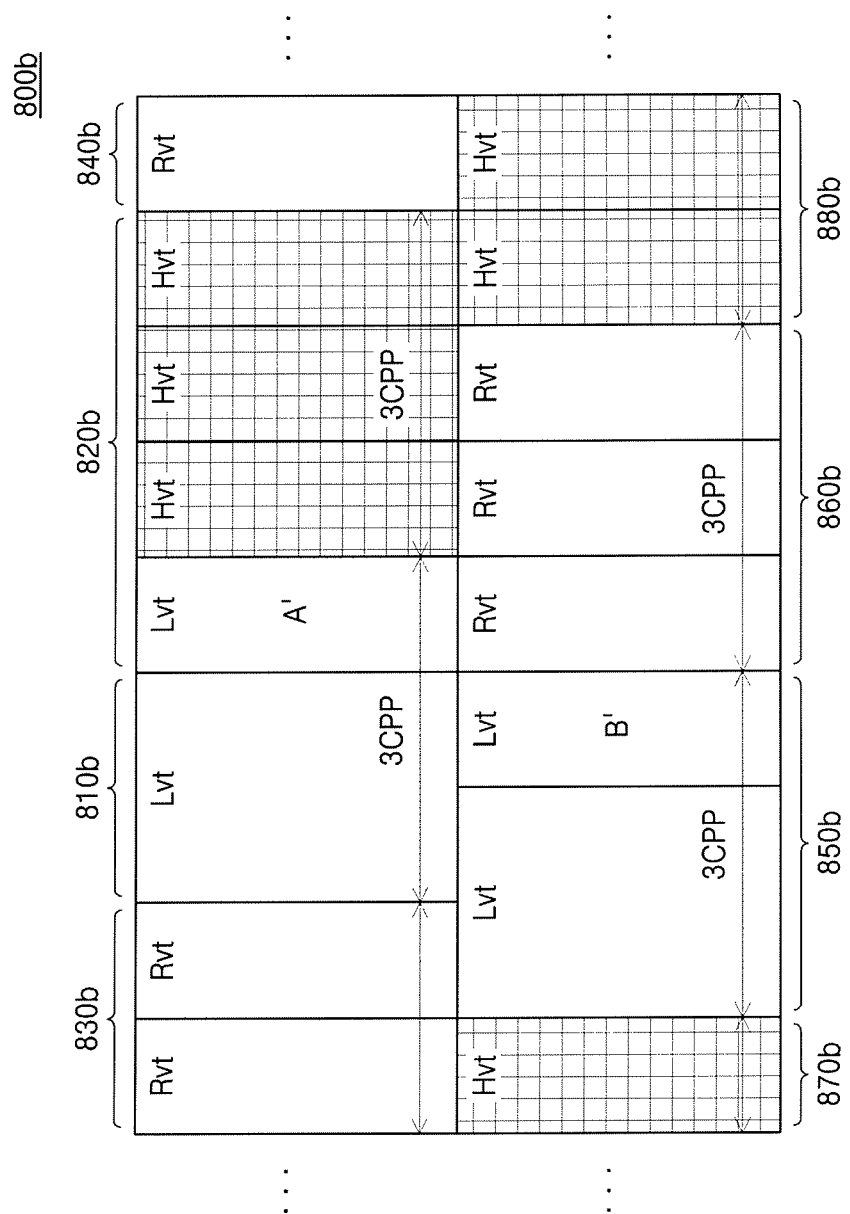

Referring to FIGS. 10A and 10B, a standard cell A of the standard cells of the HVT standard cell region 820a that corresponds to a characteristic change region in a first row Row 1 may be changed into a standard cell A' having an LVT characteristic. Also, a standard cell B of the standard cells of the RVT standard cell region 860a that corresponds to a characteristic change region in a second row may be changed into a standard cell B' having an LVT characteristic. Thus, since the LVT standard cell region 810b of FIG. 10B, which includes the LVT standard cell region 810a adjacent to the standard cell A having the changed characteristic as shown in FIG. 10A, may have a size of 3 CCP that is equal to or greater than the minimum size of the LVT block layer formed on the LVT standard cell region 810b, design rule violation may be prevented. Also, since LVT standard cell region 850b, which includes the LVT standard cell region 850a adjacent to the standard cell B having the changed characteristic as shown in FIG. 10A, has a size of 3 CPP that is equal to or greater than the minimum size of the LVT block layer formed on the LVT standard cell region 850b, design rule violation may be prevented. Each of the HVT standard cell region 820b and the RVT standard cell region 860b, which correspond to the characteristic change regions, may have a size of 3 CPP, so design rule violation may due to the block layer may be prevented.

Figure 10C:
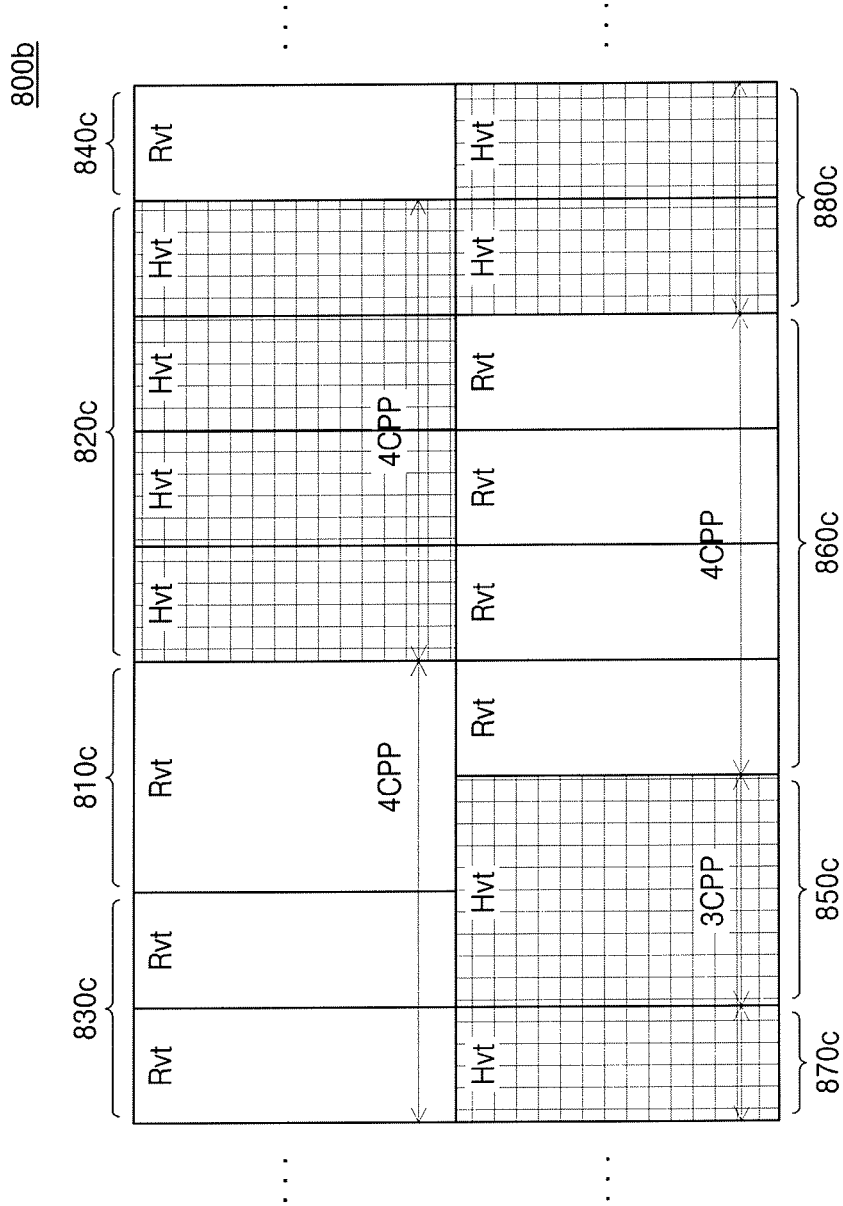

Referring to FIGS. 10A and 10C, in the case of FIG. 10C, an LVT standard cell region 810a of a first row Row1 and an LVT standard cell region 850a of a second row Row2 may be detected as characteristic change regions. On analysis of the first row Row1, when an RVT standard cell region 830a of the first row Row1, which is adjacent to the LVT standard cell region 810a, has a smaller size than 3 CPP, which is a minimum size of an RVT block layer formed on the RVT standard cell region 830a, a characteristic of all standard cells included in the LVT standard cell region 810a having a size of 2 CPP, which is the characteristic change region, may be changed to an RVT characteristic. According to an exemplary embodiment, the LVT standard cell region 810a may include two standard cells having a size of 1 CPP so that characteristics of the two standard cells may be changed into the RVT characteristic. Alternatively, the LVT standard cell region 810a may include one standard cell having a size of 2 CPP so that a characteristic of the one standard cell may be changed into the RVT characteristic. In this case, since the RVT standard cell regions 810c and 830c, which include the RVT standard cell region 810c including standard cells, of which the characteristic is changed, and the RVT standard cell region 830c corresponding to an adjacent cell region adjacent to the RVT standard cell region 810c, have a size of 4 CPP, which is greater than 3 CPP that is the minimum size of the RVT block layer, design rule violation may be prevented. In an exemplary embodiment, when the RVT standard cell region 830a of the first row Row1 has a size of 3 CPP or more, as described above, a characteristic to be changed may be selected based on priority information indicating priority of a semiconductor IC, and a characteristic of the standard cell of the characteristic change region may be changed according to the priority information.

In a second row Row2, since a combined standard cell region of RVT standard cell regions 850c and 870c, which include the HVT standard cell region 850c including standard cells, of which a characteristic is changed, and the HVT standard cell region 870c corresponding to an adjacent cell region that is adjacent to the HVT standard cell region 850c, have a size of 3 CPP that is equal to 3 CPP that is the minimum size of the HVT block layer, design rule violation may be prevented. In an exemplary embodiment, when an HVT standard cell region 870c of the second row Row2 has a size of 3 CPP or more, as described above, a characteristic to be changed may be selected based on priority indicating priority of the semiconductor IC, and a characteristic of the standard cell of the characteristic change region may be changed.

Figure 11A:
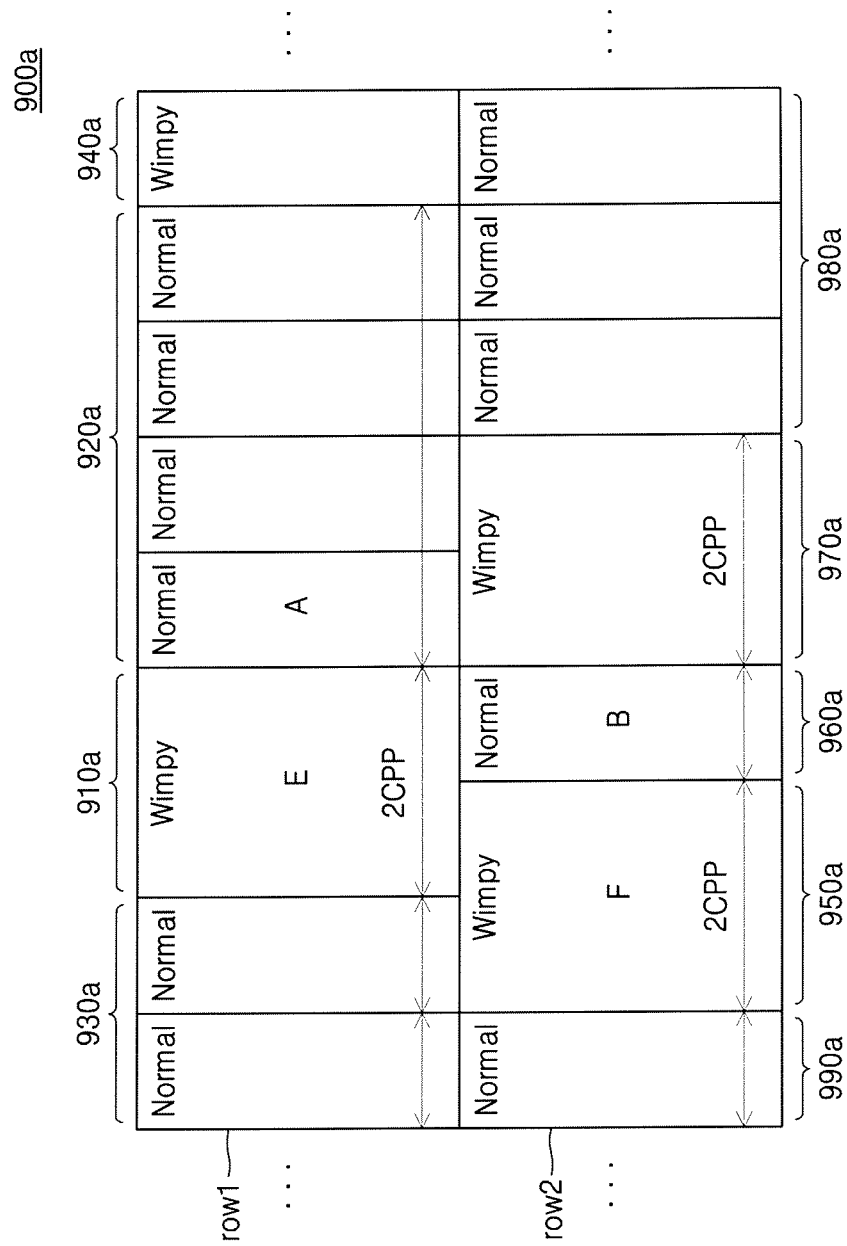
FIGS. 11A and 11B are diagrams illustrating a method of detecting a characteristic change region and a method of changing a characteristic according to an exemplary embodiment of the present inventive concept.
Figure 11B:
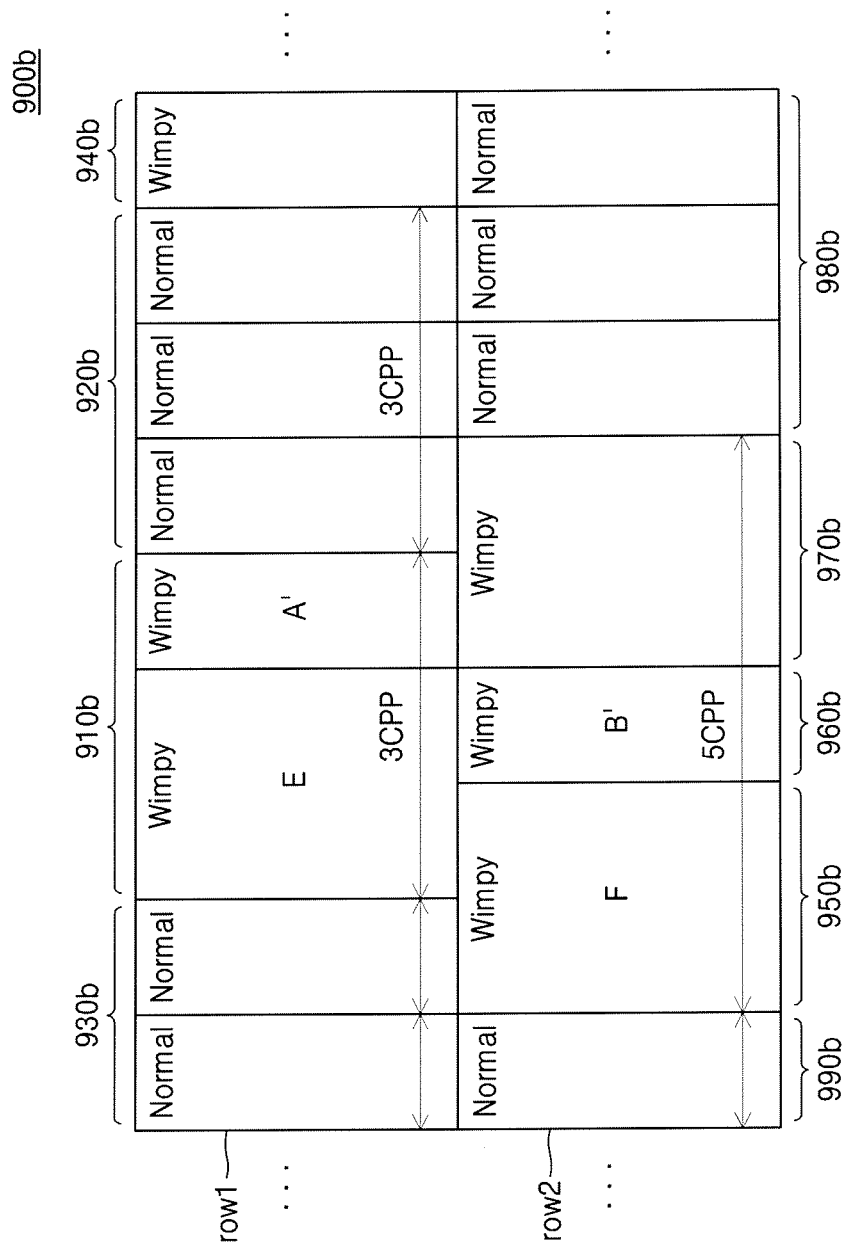

FIGS. 11A and 11B are diagrams illustrating a method of detecting a characteristic change region and a method of changing a characteristic thereof.

FIG. 11A is an estimated placing diagram (900a) obtained based on information regarding the plurality of standard cells of a standard cell library before the plurality of standard cells are placed. A first row Row1 may include wimpy standard cell regions 910a and 940a including standard cells having a wimpy characteristic, which have a greater gate length than a normal standard cell, and normal standard cell regions 920a and 930a including normal standard cells. Since the normal standard cell region 920a has a different characteristic from characteristics of the standard cells included in the wimpy standard cell regions 910a and 940a that are adjacent standard cell regions to be placed adjacent to the normal standard cell region 920a, the normal standard cell region 920a may correspond to a target standard cell region. Thus, the normal standard cell region 920a may be a target standard cell region, which is a target for detection of whether the normal standard cell region 920a corresponds to a characteristic change region.

To form the wimpy standard cell region 910a including the standard cell having the wimpy characteristic, a wimpy block layer formed on the wimpy standard cell region 910a may have a minimum size of 3CPP greater than a size of 2 CPP of the wimpy standard cell region 910a. The wimpy block layer may be a wimpy layer. When the wimpy standard cell region 910a is placed without changing the characteristic of the standard cell thereof, the wimpy block layer may be formed on one of the normal standard cell regions 920a and 930a placed adjacent to the wimpy standard cell region 910a. Accordingly, design rule violation may occur. Accordingly, the normal standard cell region 920a may be detected as the characteristic change region, so that a characteristic of at least one standard cell of the normal standard cell region 920a may be changed.

In this case, characteristic change information indicating that the normal standard cell region 920a corresponds to the characteristic change region may be generated. The generation of the characteristic change information is described above with reference to FIG. 9A, and thus descriptions thereof are omitted here.

A second row Row2 may include wimpy standard cell regions 950a and 970a including standard cells having a wimpy characteristic and normal standard cell regions 960a, 980a, and 990a including standard cells having a normal characteristic. Since the normal standard cell region 960a has a different characteristic from the characteristics of the standard cells included in the wimpy standard cell region 950a, 970a, which are to be placed adjacent to the normal standard cell region 960a, the normal standard cell region 960a may correspond to a target standard cell region. Thus, the normal standard cell region 960a may be a target standard cell region, which is a target for detection of whether the normal standard cell region 960a is a characteristic change region.

Assuming that a block layer formed on the wimpy standard cell regions 950a and 970a to have the wimpy characteristic has a minimum size of 3 CPP, the wimpy standard cell regions 950a and 970a may have a size of 2 CPP that is smaller than the minimum size of the block layer. In this case, as described above, design rule violation may occur.

FIG. 11B is a diagram 900b showing that standard cells of the normal standard cell regions 920a and 960a of FIG. 11A are placed by changing characteristics thereof. A characteristic of a standard cell A of the standard cells of the normal standard cell region 920a in a first row Row1 may be changed to a wimpy characteristic, so that the normal standard cell region 920a may be placed as a wimpy standard cell region 910b including a standard cell A' having the wimpy characteristic. Thus, a combined standard cell of the wimpy standard cell region E and the standard cell A' has a size of 3CPP, and thus design rule violation may be prevented.

Referring to FIG. 11A, in the second row Row2, the wimpy standard cell regions 950a and 970a may be placed adjacent to two sides of a normal standard cell region 960a corresponding to a characteristic change region. Thus, as in FIG. 11B, a characteristic of the standard cell of the normal standard cell region 960a of the second row Row2 may be changed to the wimpy characteristic so that wimpy standard cell regions 950b, 960b, and 970b may be placed. Accordingly, the wimpy standard cell region 950b, 960b, and 970b, which include a standard cell B', of which a characteristic is changed, and the wimpy standard cell regions 950b and 970b corresponding to adjacent cell regions placed adjacent to the standard cell B', may be placed to have a size of 5 CPP, which is greater than 3 CPP that is a minimum size of a block layer formed on the wimpy standard cell regions 950b, 960b, and 970b. However, the inventive concept is not limited thereto, and the extent to which a gate length of a standard cell may vary according to the kind of a block layer that may be referred to as a wimpy layer. For example, the gate length of a standard cell may increase by a first value using a first block layer, while the gate length of a standard cell may increase by a second value using a second block layer. In this case, a characteristic may be changed as described above based on a characteristic in which the gate length is increased by the first value more than in a normal standard cell and a characteristic in which the gate length is increased by the second value more than in the normal standard cell, and then the changed characteristic may be applied according to the inventive concept.

Figure 12A:
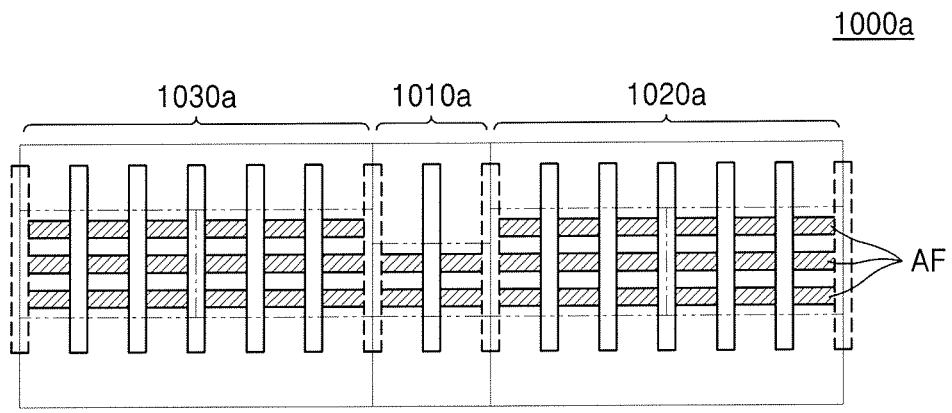
FIGS. 12A and 12B are diagrams illustrating a method of detecting a characteristic change region and a method of changing a characteristic according to an exemplary embodiment of the present inventive concept.
Figure 12B:
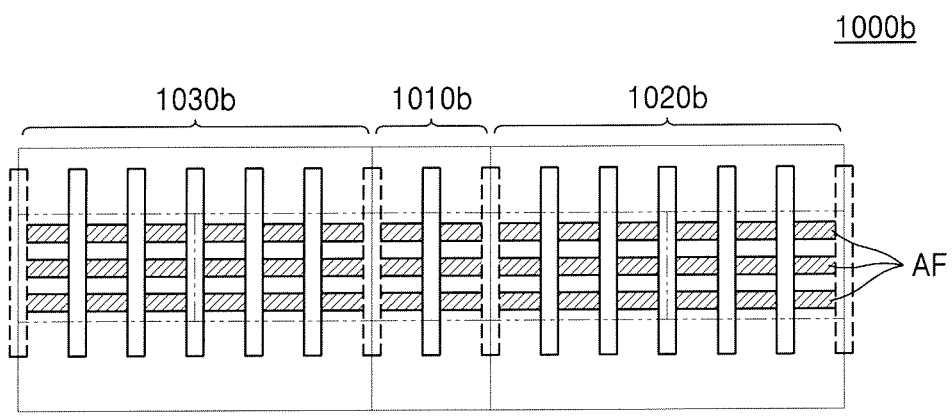

FIGS. 12A and 12B are diagrams illustrating a method of detecting a characteristic change region and a method of changing a characteristic thereof according to an exemplary embodiment.

FIG. 12A is an estimated placing diagram 1000a obtained based on information regarding a plurality of standard cells of a standard cell library before the plurality of standard cells are placed. Characteristics of the plurality of standard cells 1000a may be divided by the number of active fins AF that a transistor has. The plurality of standard cells 1000a may include a 2-fin standard cell region 1010a including standard cells having two active fins AF and 3-fin standard cell regions 1020a and 1030a including standard cells having three active fins AF. In this case, since the number of the active fins AF of the standard cells of the 2-fin standard cell region 1010a is different from the number of the active fins AF of the standard cells of the 3-fin standard cell regions 1020a and 1030a, which are adjacent to the 2-fin standard cell region 1010a, the performance of a semiconductor IC may be degraded. In an embodiment, a standard cell region including at least one standard cell having a different characteristic from any one of characteristics of standard cells to be placed adjacent thereto may be detected as a characteristic change region. Accordingly, since the 2-fin standard cell region 1010a has a different characteristic from those of the 3-fin standard cell regions 1020a and 1030a to be placed adjacent to the 2-fin standard cell region 1010a, the 2-fin standard cell region 1010a may correspond to a characteristic change region.

Referring to FIG. 12B, a standard cell having two active fins AF in the 2-fin standard cell region 1010a that corresponds to the characteristic change region in FIG. 12A may be changed to a standard cell having three active fins AF and placed in a 3-fin standard cell region 1010b. Thus, the number of the active fins AF of the standard cell in the 2-fin standard cell region 1010a may change to the number of active fins AF of standard cells of 3-fin standard cell regions 1020b and 1030b so that degradation of performance of a semiconductor IC may be prevented.

Figure 13A:
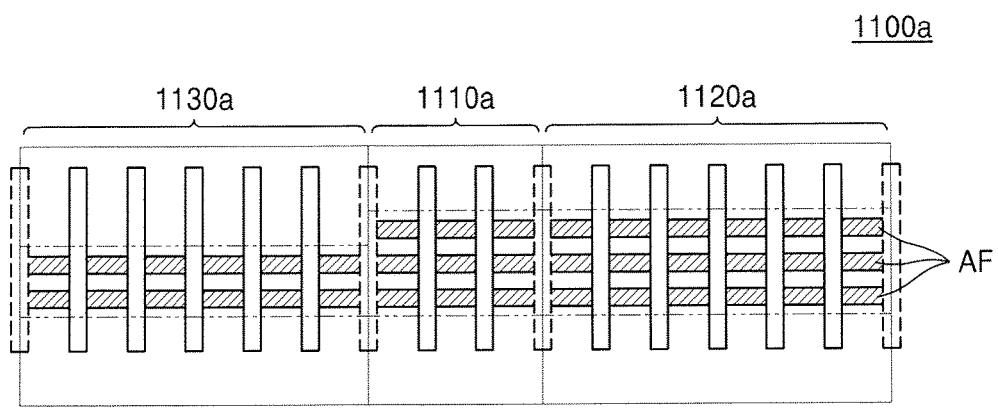
FIGS. 13A and 13B are diagrams illustrating a method of detecting a characteristic change region and a method of changing a characteristic according to an exemplary embodiment of the present inventive concept.
Figure 13B:
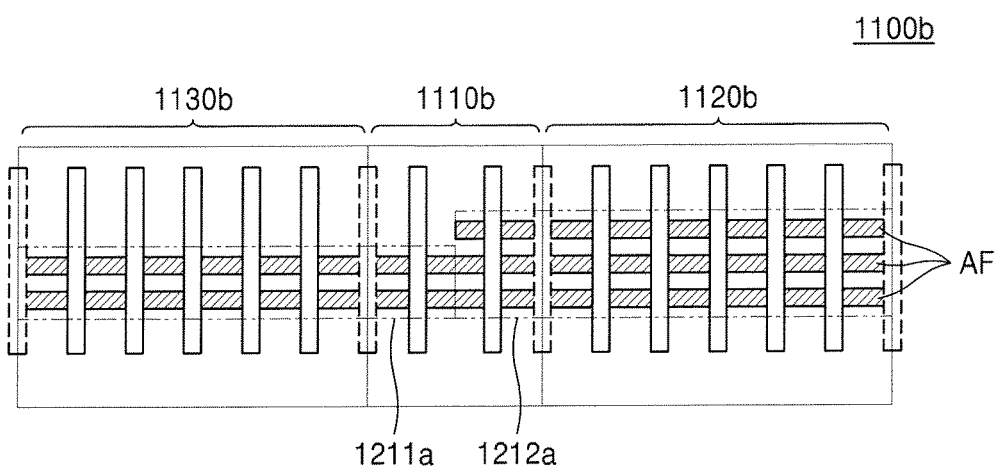

FIGS. 13A and 13B are diagrams illustrating a method of detecting a characteristic change region and a method of changing a characteristic thereof according to an exemplary embodiment.

FIG. 13A is an estimated placing diagram 1100a obtained based on information regarding a plurality of standard cells of a standard cell library before the plurality of standard cells are placed. Characteristics of the plurality of standard cells 1100a may be divided by the number of active fins AF constituting a transistor. The plurality of standard cells 1100a may include 3-fin standard cell regions 1110a and 1120a including standard cells having three active fins AF and a 2-fin standard cell region 1130a including standard cells having two active fins AF. In this case, since the number of the active fins AF of the standard cells of the 3-fin standard cell region 1110a is different from the number of the active fins AF of the standard cells of the 2-fin standard cell region 1130a, which is a standard cell region adjacent to the 3-fin standard cell region 1110a, the performance of a semiconductor IC may be degraded. In an exemplary embodiment, a standard cell region including at least one standard cell having a different characteristic from one of characteristics of standard cells to be placed adjacent thereto may be detected as a characteristic change region. Accordingly, since the 3-fin standard cell region 1110a has a different characteristic from the 2-fin standard cell region 1130a to be placed adjacent thereto, the 3-fin standard cell region 1110a may correspond to a characteristic change region.

Referring to FIG. 13B, from among standard cells having three active fins AF in 3-fin standard cell region 1110a that correspond to the characteristic change region in FIG. 13A, the number of active fins AF of a first standard cell 1211a to be placed adjacent to a 2-fin standard cell region 1130b may be changed to 2. As a result, a changed standard cell region 1110b, which is placed after the characteristic of the 3-fin standard cell region 1110a is changed, may include a first standard cell 1211a having two active fins AF and a second standard cell 1212a having three active fins AF. Accordingly, in the changed standard cell region 1110b, the first standard cell 1211a may be placed adjacent to the 2-fin standard cell region 1130b, and the second standard cell 1212a may be placed adjacent to the 3-fin standard cell region 1120b so that the respective standard cells have the same number of active fins AF. As a result, degradation of performance of a semiconductor IC may be prevented.

Figure 14A:
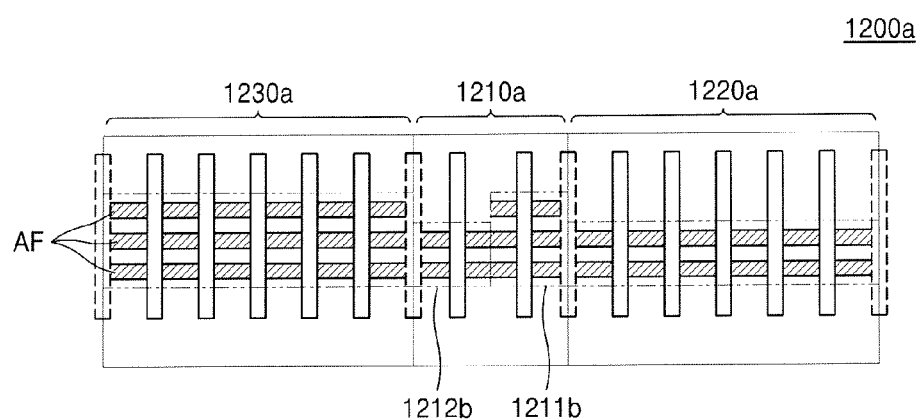
FIGS. 14A and 14B are diagrams of a plurality of standard cells illustrating a method of detecting a characteristic change region and a method of changing a characteristic according to an exemplary embodiment of the present inventive concept.
Figure 14B:
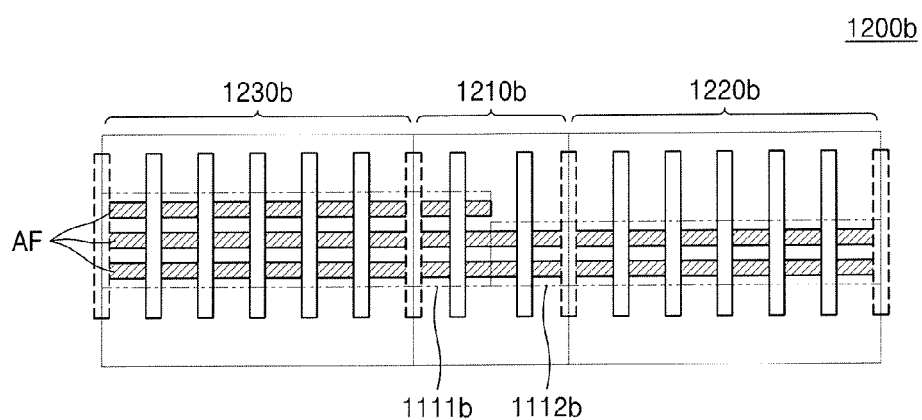

FIGS. 14A and 14B are diagrams illustrating a method of detecting a characteristic change region and a method of changing a characteristic thereof.

FIG. 14A is an estimated placing diagram obtained based on information regarding a plurality of standard cells 1200a of a standard cell library before the plurality of standard cells are placed. The plurality of standard cells 1200a may include a 2, 3-fin standard cell region 1210a including a standard cell having two active fins AF and a standard cell having three active fins AF, a 2-fin standard cell region 1220a including standard cells having 2 active fins AF, and a 3-fin standard cell region 1230a including standard cells having three active fins AF. The 2, 3-fin standard cell region 1210a may include a first standard cell 1212b having two active fins AF and a second standard cell 1211b having three active fins AF. In this case, the number of the active fins AF of the first standard cell 1212b included in the 2, 3-fin standard cell region 1210a may be different from the number of the active fins AF of the standard cell of the 3-fin standard cell region 1230a, and the number of the active fins AF included in the second standard cell 1211b may be different from the number of the active fins AF of the standard cell of the 2-fin standard cell region 1220a. Thus, performance of a semiconductor IC may be degraded.

Referring to FIG. 14B, from among standard cells having three active fins AF in 2, 3-fin standard cell region 1210a that correspond to the characteristic change region in FIG. 14A, the number of active fins AF of the first standard cell 1112b to be placed adjacent to the 3-fin standard cell region 1230b may be changed to 3. Similarly, the number of active fins AF of the second standard cell 1112b to be placed adjacent to the 2-fin standard cell region 1220b may be changed to 2. Accordingly, in the changed standard cell region 1210b, the first standard cell 1111b may be placed adjacent to the 3-fin standard cell region 1230b, and the second standard cell 1112b may be placed adjacent to the 2-fin standard cell region 1220b so that the respective standard cells have the same number of active fins AF. As a result, degradation of performance of a semiconductor IC may be prevented.

Figure 15:
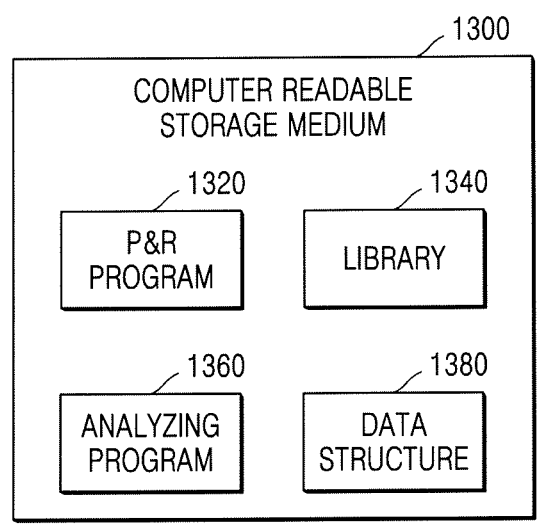
FIG. 15 is a block diagram of a computer-readable storage medium according to an exemplary embodiment of the present inventive concept.

FIG. 15 is a block diagram of a computer-readable storage medium 1300 according to an exemplary embodiment of the present inventive concept.

The computer-readable storage medium 1300 may include an arbitrary computer-readable storage medium while being used to provide commands and/or data to a computer. For example, the computer-readable storage medium 1300 may include a magnetic or optical medium (e.g., a disc, a tape, a CD-ROM, a DVD-ROM, a CD-R, a CD-RW, a DVD-R, and a DVD-RW), a volatile or non-volatile memory (e.g., a random access memory (RAM), a read-only memory (ROM), or a flash memory), a non-volatile memory that is accessible via a universal serial bus (USB) interface, and/or a microelectromechanical systems (MEMS). The computer-readable storage medium 1300 may be inserted into a computer, integrated in a computer, or combined with a computer via a network and/or a communication medium, such as a wireless link.

As shown in FIG. 15, the computer-readable storage medium 1300 may include a placing and routing program 1320, a library 1340, an analyzing program 1360, and a data structure 1380. The placing and routing program 1320 may include a plurality of commands to perform a method of using a standard cell library according to an exemplary embodiment of the inventive concept or a method of designing a semiconductor IC. For example, the computer-readable storage medium 1300 may store the placing and routing program 1320, which may include arbitrary commands to perform some or all of the flowcharts shown in at least one of the appended drawings of the inventive concept.

The library 1340 may include characteristic information regarding a standard cell, which is the unit of the semiconductor IC. For example, the library 1340 may store a standard cell library including characteristic information and characteristic change information regarding a plurality of standard cells. Alternatively, the library 1340 may store a standard cell library that does not include the characteristic information and the characteristic change information.

The analyzing program 1360 may include a plurality of commands to execute a method of analyzing the semiconductor IC based on data defining the semiconductor IC. For example, the analyzing program 1360 may include arbitrary commands to perform a method of detecting a characteristic change region or a method of changing a characteristic of a standard cell of the detected characteristic change region. The data structure 1380 may include a storage space for managing data generated during a process of using the standard cell library included in the library 1340, a process of standard cell characteristic information or characteristic change information from a normal standard cell library included in the library 1340, or a process of analyzing a timing characteristic of a semiconductor IC using the analyzing program 1360.

Figure 16:
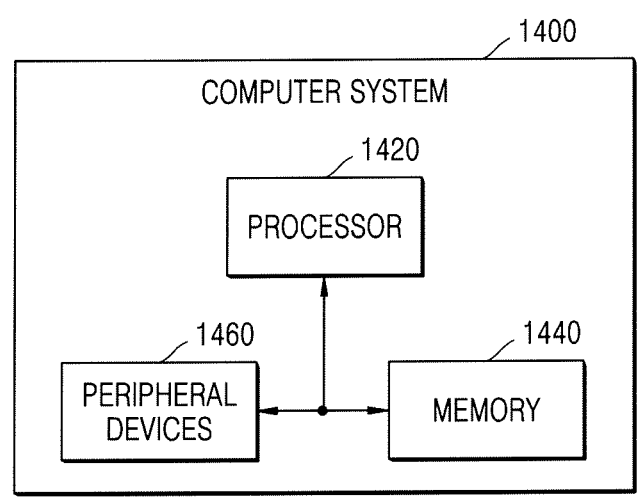
FIG. 16 is a block diagram of a computer system according to an exemplary embodiment of the present inventive concept.

FIG. 16 is a block diagram of a computer system 1400 according to an exemplary embodiment of the inventive concept.

Referring to FIG. 16, the computer system 1400 may include a processor 1420, a memory 1440, and various peripheral devices 1460. The processor 1420 may be connected to the memory 1440 and the peripheral devices 1460.

The processor 1420 may be configured to execute commands to perform at least one of the methods according to the exemplary embodiments of the inventive concept. According to an exemplary embodiment of the inventive concept, the processor 1420 may execute an arbitrary set of commands (for example, Intel Architecture-32 (IA-32), 64-bit IA-32 extension, x86-64, PowerPC, Sparc, microprocessor without interlocked pipeline stages (MIPS), architecture reference manual (ARM), IA-64, etc). Also, the computer system 1400 may include at least one processor.

The processor 1420 may be connected to the memory 1440 and the peripheral devices 1460 in an arbitrary manner. For example, the processor 1420 may be connected to the memory 1440 and/or the peripheral devices 1460 in various interconnections. In addition, at least one bridge chip may generate multiple connections between the processor 1420, the memory 1440, and the peripheral devices 1460 and connect the processor 1420, the memory 1440, and the peripheral devices 1460.

The memory 1440 may include an arbitrary type of memory system. For example, the memory 1440 may include a dynamic random access memory (DRAM), a double data rate synchronous DRAM (DDR SDRAM), or a Rambus DRAM (RDRAM). A memory controller may be included in the memory 1440 to enable an interface function. Alternatively, the memory controller may be included in the processor 1420. The memory 1440 may store commands for executing at least one of the method of using the standard cell library or the method of designing the semiconductor IC, which are described above, and data processed by the processor 1420.

The peripheral devices 1460 may include arbitrary types of hardware devices that may be included in or combined with the computer system 1400, for example, a storage device or an input/output (I/O) device (video hardware, audio hardware, user interface devices, and networking hardware).

While the present inventive concept has been shown and described with reference to exemplary embodiments thereof, it will be apparent to those of ordinary skill in the art that various changes in form and detail may be made therein without departing from the spirit and scope of the inventive concept as defined by the following claims.

What is claimed is:

1. A processor-implemented method of designing a semiconductor integrated circuit (IC), the method comprising:
    generating a standard cell library including characteristic information of a plurality of standard cells, wherein the characteristic information includes a characteristic of each standard cell;

detecting a characteristic change region including at least one of the plurality of standard cells by comparing characteristics of standard cells to be placed adjacent to the characteristic change region;

changing a characteristic of the at least one standard cell included in the detected characteristic change region to one of the characteristics of the standard cells to be placed adjacent to the characteristic change region to update the standard cell library; and placing a plurality of standard cells of the updated standard cell library;

wherein the detecting of the characteristic change region comprises:

selecting a target standard cell region including at least one standard cell having a characteristic different from the characteristics of the standard cells to be placed adjacent to the characteristic change region;

comparing a size of the target standard cell region with a minimum size of a block layer to be formed on the target standard cell region; and detecting the target standard cell region as the characteristic change region if the size of the target cell region is smaller than the minimum size of the block layer.

2. The method of claim 1, wherein the standard cell library comprises characteristic change information for changing the characteristic of the at least one standard cell included in the characteristic change region to one of the characteristics of the standard cells to be placed adjacent to the characteristic change region.

3. The method of claim 1, wherein the characteristics include a number of active fins, a gate length, and a depth of a doped well of each standard cell.

4. The method of claim 1, wherein the standard cells to be placed adjacent to the characteristic change region are placed on two sides of the characteristic change region in a horizontal direction or a vertical direction.

5. The method of claim 1, wherein the changing of the characteristic of the at least one standard cell comprises:
receiving priority information in designing of the IC;
selecting a characteristic based on the priority information from the characteristics of the standard cells to be placed adjacent to the characteristic change region; and
changing the characteristic of the at least one standard cell included in the characteristic change region to the selected characteristic.

6. The method of claim 5, wherein the priority information is information indicating whether designing of the semiconductor IC gives priority to low power consumption or whether designing of the semiconductor IC gives priority to high operating speed.

7. The method of claim 6, wherein the selecting of the characteristic corresponding to the priority information comprises:
selecting a characteristic of a lower power consumption from among the characteristics of the standard cells to be placed adjacent to the characteristic change region, if designing of the semiconductor IC gives priority to the low power consumption; and
selecting a characteristic of a higher operating speed from among the characteristics of the standard cells to be placed adjacent to the characteristic change region, if designing of the semiconductor IC gives priority to the high operating speed.

8. The method of claim 1, wherein after the changing of the characteristic of the at least one standard cell included in the detected characteristic change region, a combined cell region including the at least one standard cell of the detected characteristic change region and at least one of the adjacent cell regions adjacent to the detected characteristic change region has a size equal to or larger than the minimum size of the block layer.

9. The method of claim 1, wherein the block layer includes an implant layer for forming a well of the standard cell or a wimpy layer for forming a gate of a combined cell.

10. The method of claim 1, wherein a size of the standard cell region is measured by a unit of a pitch equal to the sum of a space between two adjacent gates formed in a standard cell included in the standard cell region and a gate length of the gates.

11. The method of claim 1, wherein the changed characteristic change region comprises a first standard cell having a first number of active fins and a second standard cell having a second number of active fins, and the first number of active fins are different from the second number of active fins.

12. The method of claim 11, wherein if a standard cell having a third number of active fins is to be placed adjacent to the first standard cell, the number of the active fins of the first standard cell is changed to the third number, wherein if a standard cell having a fourth number of active fins is to be placed adjacent to the second standard cell, the number of the active fins of the second standard cell is changed to the fourth number.

13. A processor-implemented method of designing a semiconductor integrated circuit (IC), the method comprising:

generating a standard cell library including characteristic information of a plurality of standard cells, wherein the characteristic information includes a characteristic of each standard cell;

detecting a characteristic change region including at least one of the plurality of standard cells by comparing characteristics of standard cells to be placed adjacent to the characteristic change region;

changing a characteristic of the at least one standard cell included in the detected characteristic change region to one of the characteristics of the standard cells to be placed adjacent to the characteristic change region to update the standard cell library; and placing a plurality of standard cells of the updated standard cell library, wherein the detecting of the characteristic change region comprises:

selecting a target standard cell region including at least one standard cell having a characteristic different from the characteristics of the standard cells to be placed adjacent to the characteristic change region;

comparing a size of adjacent standard cell regions including at least one standard cell to be disposed adjacent to the target standard cell region with a minimum size of a block layer formed on the adjacent cell regions; and detecting the target standard cell region as the characteristic change region if the size of the adjacent cell regions is smaller than the minimum size of the block layer.

14. A non-transitory storage medium having stored therein computer readable instructions which, when executed by a processor, cause the processor to perform a method of designing a semiconductor integrated circuit (IC), the method comprising:

generating a standard cell library including characteristic information of a plurality of standard cells, wherein the characteristic information includes a characteristic of each standard cell;

detecting a characteristic change region including at least one of the plurality of standard cells by comparing characteristics of standard cells to be placed adjacent to the characteristic change region;

changing a characteristic of the at least one standard cell included in the detected characteristic change region to one of the characteristics of the standard cells to be placed adjacent to the characteristic change region to update the standard cell library; and placing a plurality of standard cells of the updated standard cell library;

wherein the detecting of the characteristic change region comprises: selecting a target standard cell region including at least one standard cell having a characteristic different from the characteristics of the standard cells to be placed adjacent to the characteristic change region; and, one of:

(a) comparing a size of the target standard cell region with a minimum size of a block layer to be formed on the target standard cell region; and detecting the target standard cell region as the characteristic change region if the size of the target cell region is smaller than the minimum size of the block layer; or (b) comparing a size of adjacent standard cell regions including at least one standard cell to be disposed adjacent to the target standard cell region with a minimum size of a block layer formed on the adjacent cell regions; and detecting the target standard cell region as the characteristic change region if the size of the adjacent cell regions is smaller than the minimum size of the block layer.

15. The non-transitory storage medium of claim 14, wherein the standard cell library comprises characteristic change information for changing the characteristic of the at least one standard cell included in the characteristic change region to one of the characteristics of the standard cells to be placed adjacent to the characteristic change region.

16. The non-transitory storage medium of claim 14, wherein the characteristics include a number of active fins, a gate length, and a depth of a doped well of each standard cell.

17. The non-transitory storage medium of claim 14, wherein the standard cells to be placed adjacent to the characteristic change region are placed on two sides of the characteristic change region in a horizontal direction or a vertical direction.

18. The non-transitory storage medium of claim 14, wherein the changing of the characteristic of the at least one standard cell comprises:

receiving priority information in designing of the IC;

selecting a characteristic based on the priority information from the characteristics of the standard cells to be placed adjacent to the characteristic change region; and changing the characteristic of the at least one standard cell included in the characteristic change region to the selected characteristic.

19. The non-transitory storage medium of claim 18, wherein the priority information is information indicating whether designing of the semiconductor IC gives priority to low power consumption or whether designing of the semiconductor IC gives priority to high operating speed.

20. The non-transitory storage medium of claim 19, wherein the selecting of the characteristic corresponding to the priority information comprises:

selecting a characteristic of a lower power consumption from among the characteristics of the standard cells to be placed adjacent to the characteristic change region, if designing of the semiconductor IC gives priority to the low power consumption; and selecting a characteristic of a higher operating speed from among the characteristics of the standard cells to be placed adjacent to the characteristic change region, if designing of the semiconductor IC gives priority to the high operating speed.

* * * * *